United States Patent [19]

Backer et al.

[11] Patent Number: 5,180,411
[45] Date of Patent: Jan. 19, 1993

[54] OPTICAL WAVEGUIDE FIBER WITH TITANIA-SILICA OUTER CLADDING AND METHOD OF MANUFACTURING

[75] Inventors: Marcella R. Backer; Ralston R. Cavender, Jr.; Peter C. Jones, all of Wilmington, N.C.; James A. Murphy, Corning, N.Y.

[73] Assignee: Corning Incorporated, Corning, N.Y.

[21] Appl. No.: 779,521

[22] Filed: Oct. 18, 1991

Related U.S. Application Data

[63] Continuation-in-part of Ser. No. 456,141, Dec. 22, 1989, Pat. No. 5,067,975.

[51] Int. Cl.$^5$ ............................................. C03B 37/025
[52] U.S. Cl. ..................................... 65/3.12; 65/18.2; 65/33; 65/900
[58] Field of Search ..................... 501/10, 38; 65/3.11, 65/3.12, 18.2, 33.13, 900; 385/108

[56] References Cited

U.S. PATENT DOCUMENTS

| | | | |
|---|---|---|---|
| Re. 27,560 | 1/1973 | Achener | 65/3.13 |
| 3,673,049 | 6/1972 | Giffen et al. | 161/164 |
| 3,884,550 | 5/1975 | Maurer et al. | 65/3 |
| 3,962,515 | 6/1976 | Dumbaugh et al. | 501/38 |
| 4,108,674 | 8/1978 | Gliemeroth | 65/30.11 |
| 4,181,403 | 1/1980 | Macedo et al. | 350/96.33 |
| 4,184,860 | 1/1980 | Schneider et al. | 65/33 |
| 4,243,298 | 1/1981 | Kao et al. | 350/96.33 |
| 4,263,031 | 4/1981 | Schultz | 65/900 |
| 4,620,861 | 11/1986 | Berkey | 65/3.12 |
| 4,768,859 | 9/1988 | Kasori et al. | 350/96.34 |
| 4,877,306 | 10/1989 | Kar | 350/96.33 |

FOREIGN PATENT DOCUMENTS

| | | | |
|---|---|---|---|
| 57-11836 | 1/1982 | Japan. | |
| 57-11837 | 1/1982 | Japan. | |
| 1255795 | 3/1985 | Japan. | |
| 60-215538 | 10/1985 | Japan | 65/900 |

OTHER PUBLICATIONS

Oh, et al., Increased Durability of Optical Fiber Through the Use . . . , Optics Letters, May 1982, vol. 7, No. 5, pp. 241–243.

Schultz, Binary Titania-Silica Glasses Containing 10–20% T, $O_2$, Journal of the American Ceramic Society, Jun. 1976, vol. 59, No. 5–6, pp. 214–219.

"Strengthening of Glass Fibers: 1, Cladding"; D. A. Krohn & A.R. Cooper; 12/69, Journal of the American Ceramic Society.

Optical Fiber Communication Conference, 2/89; "Dynamic Fatigue Date for Fatigue Resistant Fiber in Tension vs. Bending"; G. S. Glaesemann, S. T. Gulati, Corning Glass Works.

"Improvements in Optical Fiber Reliability via High Fatigue Resistant Composition"; S. T. Gulati, J. D. Helfinstine and G. S. Glaesemann, SPIE vol. 842 Fiber Optics: Benign and Adverse Environments (1987).

"The Fracturing of Glass"; Terry A. Michalske and Bruce C. Bunker, pp. 122–129, Scientific American, Dec. 1987.

"Strength and Toughness of Continuous-Alumina-Fiber-Reinforced Glass-Matrix Composites"; Terry A. Michalske & John R. Hellmann; Sep. 1988, Journal of the American Ceramic Society.

"Low Loss Silica Core-Borosilicate Clad Fiber Optical Waveguide"; J. B. MacChesney, R. E. Jaeger, D. A. Pinnow, F. W. Ostermayer, T. C. Rich & L. G. VanUitert; American Ceramic Society Bulletin, vol. 52, No. 9 (1973).

*Primary Examiner*—Robert L. Lindsay
*Attorney, Agent, or Firm*—K. McNeill Taylor, Jr.

[57] ABSTRACT

A method of making an optical waveguide fiber with a fatigue resistant $TiO_2$-$SiO_2$ outer cladding, and a substantially glass blank for drawing into such fiber, wherein a glass soot $TiO_2$-$SiO_2$ outermost layer, with an initial $TiO_2$ concentration greater than 10.5 wt. %, is deposited on a preform, and the preform is exposed to an atmosphere of chlorine and oxygen at a high temperature, and the resulting $TiO_2$ concentration in the outermost layer of the $TiO_2$-$SiO_2$ outer cladding of the substantially glass blank is less than the initial $TiO_2$ concentration. In the glass blank form, the outermost layer includes a substantial volume percentage of crystalline phases and in the fiber form, the outermost layer includes inhomogeneities.

14 Claims, 16 Drawing Sheets

- ● 2.5 μm one layer ($Cl_2$, $O_2$)
- ▼ 3.5 μm one layer (no$Cl_2$, no$O_2$)
- ○ 2.5 μm one layer ($Cl_2$, $O_2$)
- □ 3.5 μm two layer – 3.1/6.4 μm ($Cl_2$, slight $O_2$)
- ◊ 1.0 μm one layer ($Cl_2$, no $O_2$)

- ● 2.5 μm one layer (Cl$_2$, O$_2$)
- ▽ 3.5 μm one layer (noCl$_2$, noO$_2$)
- ○ 2.5 μm one layer (Cl$_2$, O$_2$)
- □ 3.5 μm two layer - 3.1/0.4 μm (Cl$_2$, slight O$_2$)
- ◇ 1.0 μm one layer (Cl$_2$, no O$_2$)

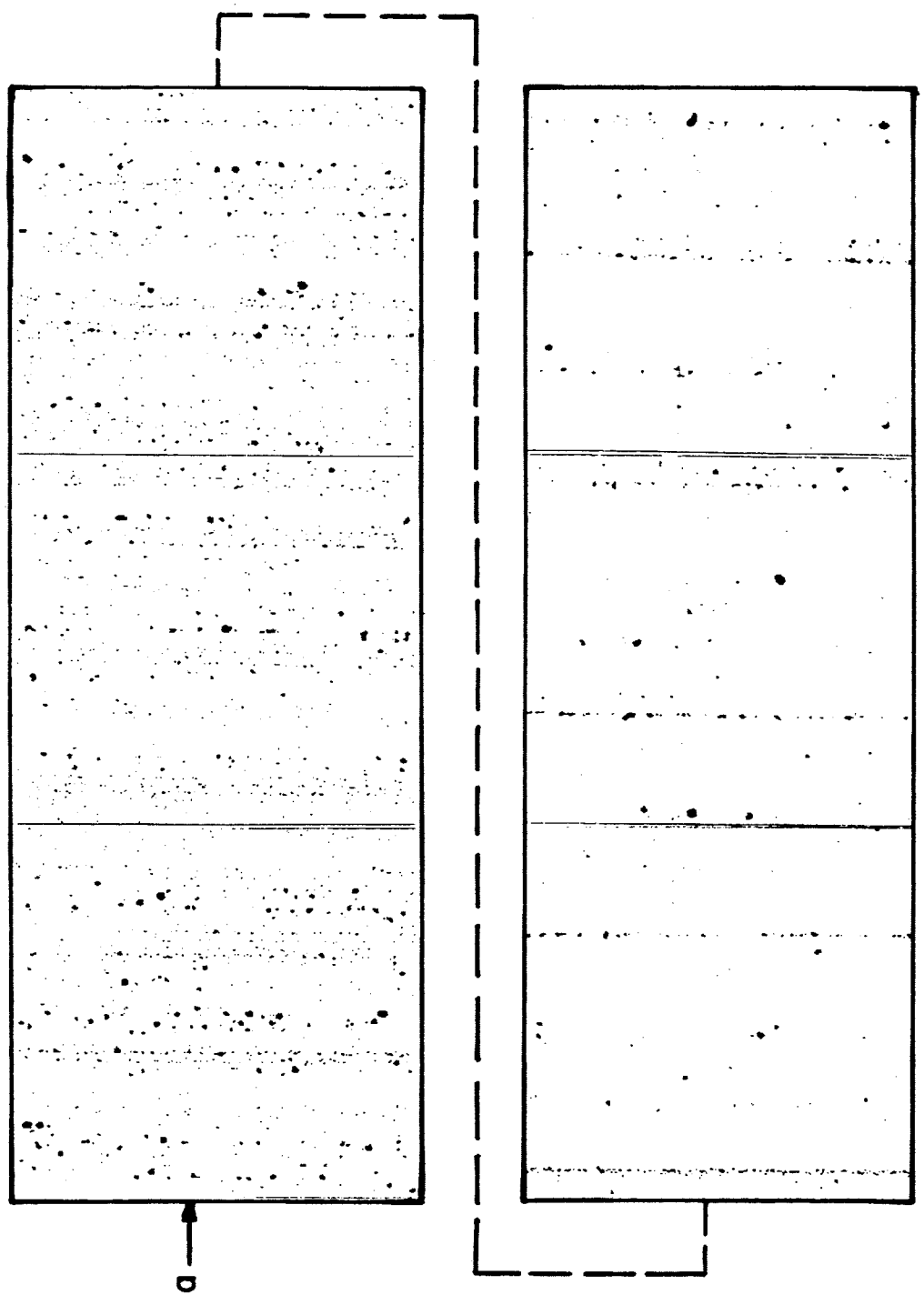

■ - NO MANUFACTURING PROBLEMS
□ - MANUFACTURING PROBLEMS

- 2.5 μm one layer (Cl$_2$, O$_2$)
- 3.5 μm two layer – 3.1/0.4 μm (Cl$_2$, slight O$_2$)
- 1.0 μm one layer (Cl$_2$, no O$_2$)

OPTICAL WAVEGUIDE FIBER WITH TITANIA-SILICA OUTER CLADDING AND METHOD OF MANUFACTURING

This is a continuation-in-part of our prior application Ser. No. 456,141, filed Dec. 22, 1989, now U.S. Pat. No. 5,067,975.

BACKGROUND OF THE INVENTION

This invention relates to a method for making an optical waveguide fiber with a fatigue resistant $TiO_2$-$SiO_2$ outer cladding.

Although glass is a brittle material, the intrinsic strength of pristine glass optical fibers is very high, on the order of 1,000,000 psi for $SiO_2$ based fibers. Typically, glass optical fibers fail from surface imperfections when placed under sufficient tensile stress. Accordingly, much effort has been devoted to the elimination of surface flaws by careful handling during and after glass forming, by a protective plastic coating, and by various treatments to the glass surface. In the latter case, one method of reducing failure by surface flaws is to provide a compressive stress on the glass surface that counteracts applied tensile stresses.

It is well known that flaws in glass grow subcritically prior to failure when subjected to tensile stress in the presence of water, ammonia, or other corrosive agents. This phenomenon of subcritical crack growth in glass is known as fatigue and greatly impacts the long-term reliability of glass based materials such as glass optical fibers. Therefore, the fatigue performance of optical fiber is especially important to the design of low cost fiber cables which have fewer strength members and less environmental protection than standard optical telecommunications cables.

It has been known for some time that the strength of a glass body may be increased by forming its surface region from a glass with a thermal coefficient of expansion that is lower than the thermal coefficient of expansion of the interior glass. As the combination is cooled from high temperatures, this configuration places the glass surface in compression, thereby inhibiting the formation and growth of cracks. See, e.g.: Giffen et al. U.S. Pat. No. 3,673,049; and Krohn and Cooper, "Strengthening of Glass Fibers: I, Cladding", Journal of the American Ceramic Society, Vol. 52, No. 12, pp. 661-4, Dec. 1969.

Numerous attempts have been made to create a strengthened optical fiber with such a compressive surface layer. See, Maurer et al. U.S. Pat. No. 3,884,550; MacChesney et al., "Low Loss Silica Core-Borosilicate Clad Fiber Optical Waveguide", American Ceramic Society Bulletin, Vol. 52, p. 713, 1973. Macedo U.S. Pat. No. 4,181,403 refers to compression in a thin surface layer formed by "molecular stuffing" in fiber with a large optical core and very thin optical cladding. Some of these attempts involved the use of a $TiO_2$-$SiO_2$ outer layer on the fiber, as its thermal coefficient of expansion is known to be less than that of $SiO_2$. See, e.g.: Schneider et al. U.S. Pat. No. 4,184,860; Kao et al. U.S. Pat. No. 4,243,298; and, Taka et al. Japanese Patent No. 1,255,795.

Schneider et al. U.S. Pat. No. 4,184,860 describes an outer $TiO_2$-$SiO_2$ layer with 8 wt. % $TiO_2$ surrounding a 15 wt. % $TiO_2$ layer which is heat treated (by "tempering") to devitrify and partially separate and/or crystallize. This heat treatment of the 15 wt. % $TiO_2$ intermediate layer is intended to raise the thermal coefficient of expansion so that it is substantially greater than the coefficient of the outer $TiO_2$-$SiO_2$ layer, thereby putting the outer layer in compression. Thus, the Schneider et al. fiber design relies on the 8 wt. % $TiO_2$ outer layer to provide enhanced strength through compression.

Schultz studied $SiO_2$-$TiO_2$ glasses containing 10-20 wt. % $TiO_2$ which were clear when formed, but which exhibited increased opacity from phase separation and anatase formation, along with large changes in thermal expansion, upon heat treatment at temperatures below the annealing point. "Binary Titania-Silica Glasses Containing 10 to 20 Wt. % $TiO_2$", Journal of the American Ceramic Society, Vol. 58, No. 5-6, May-June 1976 (Schultz U.S. Pat. No. 3,690,855). By studying the physical properties of these $TiO_2$-$SiO_2$ compositions, Schultz described three glass forming regions as stable (0-10 wt. %), metastable (10-18 wt. %) and unstable (>18 wt. %).

Some recent research has been directed toward understanding the mechanism of crack growth in $SiO_2$ glass on the molecular level. See, Michalske and Bunker, "The Fracturing of Glass", Scientific American, Dec. 1987, pp. 122-129. The Michalske and Bunker paper presents an atomistic study of glass fracture in the presence of water, but is limited to homogeneous $SiO_2$ glass. Additional research has been directed toward crack growth in continuous fiber filled composites. See, Michalske and Hellmann, "Strength and Toughness of Continuous-Alumina Fiber-Reinforced Glass-Matrix Composites," Journal of the American Ceramic Society, Vol. 71, No. 9, pp. 725-31, Sep. 1988.

SUMMARY OF THE INVENTION

Our invention resides in a manufacturing process for producing a markedly superior fiber design which provides a surprising improvement in fatigue resistance.

In accordance with one aspect of our invention, a manufacturing process for a glass blank to be drawn into an optical waveguide fiber is provided, including depositing glass soot in the form of a soot preform including an outer cladding of $TiO_2$-$SiO_2$ with an outermost layer having an initial $TiO_2$ concentration greater than 10.5 wt. %, exposing the preform to an atmosphere containing chlorine at a temperature in the range of about 900° C. to about 1400° C., for a time sufficient to dehydrate and consolidate the preform into the substantially glass blank, wherein the resulting $TiO_2$ concentration in the outermost layer of the $TiO_2$-$SiO_2$ outer cladding of the substantially glass blank is less than the initial $TiO_2$ concentration.

In accordance with another aspect of our invention, a method of making a fatigue resistant optical waveguide fiber with a $TiO_2$-$SiO_2$ outer cladding, is provided including forming a doped $SiO_2$ preform with a core portion and a cladding portion, depositing a layer of $TiO_2$-$SiO_2$ soot on the outside of the cladding portion to create an augmented preform, the $TiO_2$-$SiO_2$ layer including at least one sub-layer having a $TiO_2$ concentration greater than 10.5 wt. %, exposing the augmented preform to an atmosphere containing chlorine at a temperature within the range of about 900° to 1400° C., consolidating the preform into a substantially glass blank, the exposing and consolidating steps resulting in greater than about 2 volume percent $TiO_2$ crystalline phases with diameters greater than or equal to about 0.3 μm within the $TiO_2$-$SiO_2$ layer of the substantially glass blank, and drawing the substantially glass blank into an optical waveguide fiber with inhomogeneities in the outer TiO$_2$-SiO$_2$ layer of the fiber.

BRIEF DESCRIPTION OF THE DRAWINGS

FIGS. 5a-5c are computer simulated maps of SEM photomicrographs of part of the outer TiO$_2$-SiO$_2$ layer of three different consolidated glass blanks.

FIGS. 7a-1, 7a-2, 7b-1, 7b-2, 7c-1 and 7c-2 are graphs of TiO$_2$ concentration vs. layer thickness for the glass blanks depicted in FIGS. 5a-5c and 6a-6c, as measured with electron microprobe techniques.

DETAILED DESCRIPTION

Figure 1:
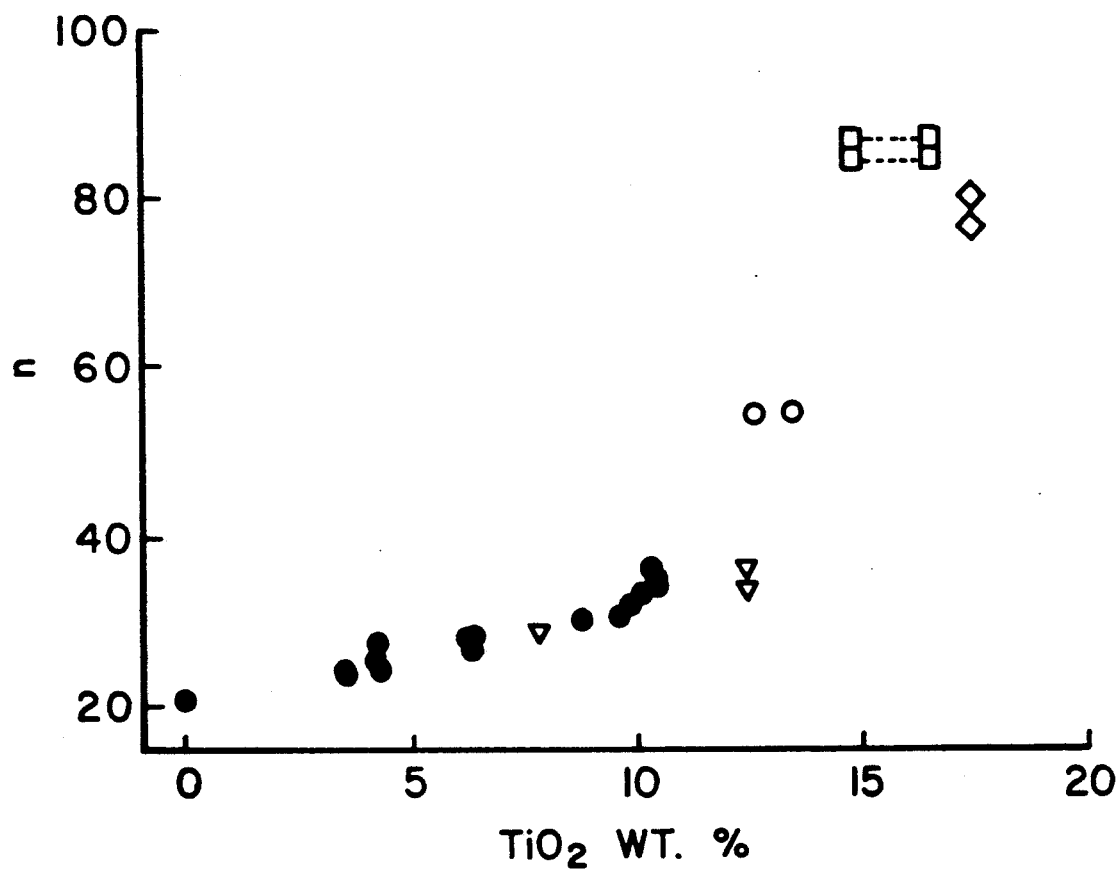
FIG. 1 is a graph of dynamic fatigue (n value) vs. TiO$_2$ concentration.

We have found that inhomogeneities in TiO$_2$-SiO$_2$ outer cladding layers provide new mechanisms for crack growth resistance in optical waveguide fibers Some of the possible explanations of this property are: 1) alteration of the SiO$_2$ network by the presence of TiO$_2$, so that when the network is stressed, it has more options for accommodating the applied stress or greater compliance (this correlates with a substantial decrease in Young's modulus); 2) the tendency of high TiO$_2$ concentration inhomogeneities to expand upon cooling, placing a residual stress on a crack in their vicinity and acting as a means of crack closure; 3) crack tip deflection by the inhomogeneities (the stress intensity at the crack tip is greatly decreased when the crack is directed away from the direction normal to the applied tensile stress); 4) the resistance of the inhomogeneities to transgranular fracture; 5) microcrack toughening where a crack encountering an inhomogeneity initiates several smaller cracks out of the matrix/inhomogeneity interface (the creation of multiple cracks from a single crack is a source of strain energy dissipation); and, 6) crack growth resistance via crack tip shielding by inhomogeneities. Some of these fatigue resistance mechanisms have similarities to mechanisms found to be active in glass-ceramics and in fiber and whisker reinforced composites. See, Michalske and Hellmann, "Strength and Toughness of Continuous-Alumina Fiber-Reinforced Glass-Matrix Composites," Journal of the American Ceramic Society, Vol. 71, No. 9, pp. 725-31, Sep.1988.

It is well recognized that the current understanding of how flaws grow subcritically in glass fibers is in its infancy. The complicating factors are, inter alia, that crack growth cannot be directly observed due to extremely small flaws, that strength and fatigue measurements that are statistical in nature must be used to infer crack growth, and furthermore, that flaws remaining after proof stress are so infrequent that their fatigue behavior must be simulated by artificially introduced defects added during fatigue testing. These difficulties require complicated testing with results that are oftentimes counter-intuitive. Thus, test results and theories must receive careful study.

In this patent application, it is assumed that fracture mechanics applies to flaws in glass optical fibers: namely, that the stress intensity factor, $K_I$, is related to the applied tensile stress, $\sigma_a$, and flaw depth, a, by $$K_I = 0.73\sigma_a(\pi a)^{\frac{1}{2}} \tag{1}$$

When $K_I$ reaches the fracture toughness, $K_I = K_{Ic}$, failure occurs and the above equation can be rearranged to give strength, $\sigma_f$, as a function of crack depth, a, $$\sigma_f = K_{Ic}/0.73(\pi a)^{\frac{1}{2}} \tag{2}$$

It is also assumed that the power law crack velocity model describes the relationship between crack velocity and stress intensity factor by, $$V = AK_I{}^n \tag{3}$$

where A and n are crack growth parameters. The crack growth parameter n is of particular value in that it gives a measure of a material's susceptibility to subcritical crack growth. For optical fibers n is often measured using the dynamic fatigue technique where fiber strength, $\sigma_f$, is measured as a function of stress rate, $\sigma_r$, where, $$\left(\frac{\sigma_{f1}}{\sigma_{f2}}\right)^{n+1} = \left(\frac{\sigma_{r1}}{\sigma_{r2}}\right) \tag{4}$$

The subscripts 1 and 2 indicate different measured strengths for different rates of stress. The value for n is determined by simple regression of log strength versus log stress rate where the slope is equal to $1/(n+1)$. For a general discussion of the measurement of fatigue resistance n value, see Glaesemann, Jakus, and Ritter, "Strength Variability of Indented Soda-Lime Glass", Journal of the American Ceramic Society, Vol. 70, No. 6, Jun. 1987, pp. 441-444.

For the n values given herein, fiber strength was measured in 100% relative humidity at approximately 25° C. using 20 meter gauge lengths. The stress rates used correspond to strain rates of 4 and 0.004%/min. The standard deviation of the slope $\{1/(n+1)\}$ was typically 10% of the mean for the n values reported herein. A similar, but not as exhaustive, dynamic fatigue test technique is given in E.I.A. test procedure FOTP-76. Strength data set forth herein (as opposed to fatigue resistance data) were measured with the 4%/min. strain rate under the above environmental conditions.

Figure 2A:
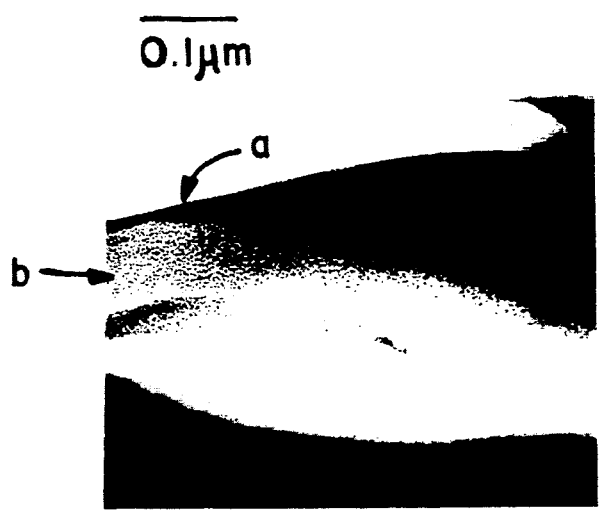
FIGS. 2a-2d are photomicrographs of the outer TiO$_2$-SiO$_2$ layers of optical fibers, using STEM techniques.

FIG. 1 depicts the measured n values graphed vs. $TiO_2$ concentration for a series of fibers with varying $TiO_2$ concentration, $TiO_2$-$SiO_2$ layer thickness, and manufacturing conditions (note: the concentrations plotted by the connected open squares depict both concentrations of a two layer outer cladding—see the discussion below re.: FIG. 2a for a detailed description). The following information is given for each fiber type in the graph: layer thickness; whether a higher concentration outermost layer was included (the use of such layers is discussed below); and, the gases used in dehydration/consolidation (also discussed below).

FIG. 1 depicts the surprising increase in fatigue resistance in our inventive fibers. In the discussion below, we shall describe the inhomogeneous $TiO_2$-$SiO_2$ outer cladding structures in our inventive fibers which may explain this surprising increase in fatigue resistance. As can be seen from FIG. 1, in optical waveguide fibers with a thin outer cladding of $TiO_2$-$SiO_2$, fatigue resistance increases with increasing $TiO_2$ concentration. Up to 10-11 wt. % $TiO_2$, fatigue resistance increases smoothly with increasing $TiO_2$ concentration. Above about 10-11 wt. % TiO2, we have found an unexpected and dramatic increase in n values. The trend appears to begin at about 10-11 wt. %, as indicated by the last few closed circles in FIG. 1, with n values from about 30-37.

As seen from FIG. 1, above about 10-11 wt. % $TiO_2$, n values increase above the level that would be expected from a linear extrapolation of the n values for lower $TiO_2$ concentrations. Such a linear extrapolation is given by the equation, $n = 1.29 W + 19.77$, where W is the weight percent $TiO_2$. For example, the predicted n value for 15 wt. % would be 39.1, the predicted n value for 17 wt. % would be 41.7, and the predicted n value for 20 wt. % would be 45.6.

As shown in FIG. 1, the n value for the fiber designated with an open circle around 13.4 wt. % $TiO_2$ is about 55, much greater than the n value of about 30 measured for the fiber designated by a closed circle around 10 wt. % $TiO_2$. The fiber with the 13.4 wt. % $TiO_2$ layer is depicted in FIG. 2c, and FIG. 2c shows that the fiber included a substantial volume of inhomogeneities. A similar fiber with a 2.5 μm $TiO_2$-$SiO_2$ layer of about 12.6 wt. % $TiO_2$ had an n value of about 54; this n value is designated by the other open circle in FIG. 1. The fibers designated by the open squares and open diamonds show an even more dramatic increase, up to an n value of 87. The apparent anomaly in the results associated with the fibers designated by open inverted triangles is discussed below with respect to the manufacturing process used to make these fibers.

The data indicate that the highly superior properties of $TiO_2$-$SiO_2$ clad fiber are not the result of bulk compressive stresses on the cladding surface as believed in the prior art, but are due to the inhomogeneous structure of the material. It is important to note that since n is used as an exponent, for the increases in n value depicted in FIG. 1 with respect to higher $TiO_2$ concentrations, the increase in fatigue resistance in our inventive fibers is even more dramatic than the graph implies.

A. STRUCTURE OF $TiO_2$-$SiO_2$ LAYER

It is instructive to consider $TiO_2$-$SiO_2$ compositions in four forms: 1) bulk glass in general; 2) low density soot preforms; 3) higher density glass blanks after dehydration/consolidation; and, 4) optical fibers after drawing. For $TiO_2$-$SiO_2$ compositions in general, at $TiO_2$ concentrations below the eutectic (about 10.5 wt. % $TiO_2$), the $TiO_2$ appears to be both randomly dispersed in the $SiO_2$ matrix and present in clusters of 5- and 6-fold coordinated Ti ions (4- fold coordinated Ti ions are less likely to occur in clusters and are only clustered in combination with 5- or 6- fold coordinated Ti ions). More specific characterizations of such compositions in drawn fiber are provided below. As $TiO_2$ concentrations increase above the eutectic, these clusters are nucleating sites for somewhat spherical phase separated regions or "inhomogeneities" which grow in size and may begin to devitrify as crystalline $TiO_2$.

In the region of maximum glass stability—below the eutectic—these inhomogeneities have not been observed: i.e., there are no significant levels of clusters greater than about 10 Angstroms in diameter, the resolution limit for our conventional Scanning Transmission Electron Microscope (STEM) instrument (note: other instruments or techniques may be capable of resolving phase separated $TiO_2$-$SiO_2$ at even smaller diameters). Based on molar volume calculations, we believe that an inhomogeneity detectable by STEM techniques would contain at least about 80 Ti atoms.

It is also possible to detect phase separation (i.e., to distinguish an inhomogeneity from a cluster) when the inhomogeneity reaches a sufficient size that discontinuities appear in macroscopic physical properties such as thermal expansion coefficient, density, refractive index, volume of mixing, strain and anneal points as a function of concentration. Such discontinuities have been correlated classically to a transition from an amorphous to a phase separated state.

We have found that after drawing at temperatures above about 1900° C., optical fiber $TiO_2$-$SiO_2$ layers are amorphous glass at $TiO_2$ concentrations below about 11 wt. %. However, we believe that the Ti ions are not randomly dispersed in the $SiO_2$ matrix but tend to cluster with other Ti ions in 5- and 6-fold coordination, the same as in bulk glasses as described above. Valence bond theory suggests that it is unlikely that an isolated 5- or 6- fold coordinated Ti ion exists in the glass network: each such Ti ion would likely be linked to at least one other Ti ion, resulting in clustering. It should also be noted that the coordination of the Ti ions in optical fiber may be affected by the fast quench associated with the fiber drawing process and the presence of crystalline $TiO_2$ in the glass blank from which the fiber is drawn.

Clusters in compositions below about 11 wt. % $TiO_2$ are smaller than the critical size required for nucleation either as a separate liquid or crystalline phase in the draw process. Below this $TiO_2$ concentration, microscopic properties of the glass network control the mechanical performance of the resulting fibers, while above this level, "macroscopic" effects due to phase separation and crystallization determine the fibers' mechanical performance. In addition, as explained below, dehydration/consolidation in $Cl_2$ increases the crystallization in the glass blank from which fibers are drawn, and such fibers appear to have a greater degree of phase separation.

For compositions below about 11 wt. % $TiO_2$, and in the homogeneous glass matrix for higher $TiO_2$ compositions, we believe that the enhanced fatigue resistance of $TiO_2$-$SiO_2$ over $SiO_2$ may be explained by reference to bond force constants rather than bond energy, and by reference to the strong likelihood of clustered Ti ions in the glass.

Considering bond energy alone, $TiO_2$-$SiO_2$ compositions would appear to be weaker than pure $SiO_2$, as the Ti-O bond strength as reported in the literature is on the order of 70 Kcal/mole as opposed to 110 Kcal/mole for the Si-O bond. However, consideration of bond force constants leads to a very different result. In $TiO_2$-$SiO_2$ compositions, regardless of the Ti ion coordination, there are numerous Ti-O-Si linkages. Compared to an Si-O-Si linkage, the oxygen atom in a Ti-O-Si linkage resides in a more asymmetric, broadened potential well. Such broadening makes many more vibrational states accessible to the system, in effect making the system as a whole "softer". Because of the looseness of this array relative to the more rigid Si-O-Si environment, the Ti-O-Si linkages formed as a result of $TiO_2$ addition will function as high energy dissipating regions to remove energy at the stress point of the crack tip. Clustering of 5- and 6- fold coordinated Ti ions would result in even greater enhancement of fatigue resistance and extended regions of enhanced energy dissipation in the glass, as the potential wells for $^{IV}Si$-O-$^{V}Ti$ and $^{IV}Si$-O-$^{VI}Ti$ linkages would be even more asymmetric than for $^{IV}Si$-O-$^{IV}Ti$, and therefore the system would be even "softer".

At compositions above around 11 wt. % $TiO_2$ where phase separated $TiO_2$-$SiO_2$ becomes visible, the Ti-O-Si linkages within each phase domain and the Ti-O-Si linkages forming the interface between the $TiO_2$-rich inhomogeneity and the $SiO_2$-rich matrix are very important to enhanced fatigue resistance. Our analysis indicates that for $TiO_2$-$SiO_2$ bulk glass in general at $TiO_2$ concentrations above the eutectic, the composition of the phase separated domains or inhomogeneities is approximately the same, viz. 92–95 wt. % $TiO_2$ in at least an 11 wt. % $TiO_2$ matrix. It is conceivable that the matrix concentration could be as high as 19 wt. % $TiO_2$.

For all $TiO_2$ concentrations we have studied below about 19 wt. %, we believe the number of inhomogeneities increases with increasing overall $TiO_2$ concentration, but the size and composition remain approximately the same. Similarly, the concentration of $TiO_2$ dissolved as clustered Ti below the inhomogeneity size threshold in the $SiO_2$-rich matrix stabilizes at a maximum near the eutectic bulk composition at 11–13 wt. % $TiO_2$.

The structure and composition of the soot as laid down, and of the glass blank after dehydration/consolidation are discussed below in connection with a description of the manufacturing process. In the drawn fiber, for the concentration regions studied, the proportion of inhomogeneities may increase to more than 50 vol. %. During the draw process, the large $TiO_2$ crystals (anatase, and rutile at the higher concentrations) in the glass blank dissolve into a $TiO_2$-$SiO_2$ melt at temperatures above about 1900° C., and subsequently precipitate out as much smaller phase separated domains or inhomogeneities in the quenched fiber, as the fiber rapidly cools to below about 1550° C.

In the drawn fiber, a substantial portion of the inhomogeneities we have observed are between 10 and 100 Angstroms in diameter, typically approximately 30–50 Angstroms. For inhomogeneities of this scale, the composition of each phase region cannot be measured even by electron microsopy techniques. In the drawn fiber, most of the inhomogeneities we have observed appear to be phase separated regions without substantial crystal content, although we have observed a few inhomogeneities which appear darker in STEM photomicrographs, suggesting crystal content. For the purposes of this application, detectable crystalline content in a fiber layer shall mean a substantial number of crystals with diameters greater than about 200 Angstroms.

The number and volume percentage of phase separated and crystalline $TiO_2$ domains increase with increasing $TiO_2$ concentration. As described below, drying the preform in $Cl_2$ will increase the likelihood of phase separation and potential crystallization in the fiber. In regions of fibers with $TiO_2$ concentration near the eutectic, if phase separation does occur, the domains reflect volume percentage and distribution that is similar to the levels of anatase crystals within the blank. The fiber may show discrete regions of phase separated $TiO_2$-$SiO_2$ (where anatase had dissolved into the glass during draw and subsequently precipitated out) in a $TiO_2$-$SiO_2$ matrix glass that is itself not phase separated at that $TiO_2$ concentration. In effect, the development of large anatase (and perhaps rutile) crystals in the blank in the dehydration/consolidation process results in the onset of liquid immiscibility in the fiber at $TiO_2$ concentrations lower than those expected from equilibrium considerations and from previous investigations of $TiO_2$-$SiO_2$ bulk glass compositions in general. At concentrations exceeding about 13 wt. % $TiO_2$, much more extensive, continuous and uniform phase separation is apparent in the fiber.

STEM photomicrographs of the inhomogeneities as present in optical fibers of varying concentration, layer thickness and manufacturing conditions are shown in FIGS. 2a–2d.

The fiber depicted in FIG. 2a had a 3.5 $\mu$m $TiO_2$-$SiO_2$ outer layer including a 3.1 $\mu$m first layer with 14.7 wt. % $TiO_2$ (end-on SEM measurement of the fiber and electron microprobe of the blank), and an higher concentration layer with about 16.7–17 wt. % $TiO_2$ (16.7 wt. %: electron microprobe of the blank; 17 wt. %: as extrapolated from the deposition flows). The soot preform was dehydrated/consolidated in $Cl_2$ with a small amount of $O_2$ introduced by a leaking valve. The measured n value was 87. The region of the fiber surface is indicated by "a" and the region of inhomogeneities is indicated by "b". The n value measurements for this fiber are designated by the open squares in FIG. 1, and the intrinsic strength measurements are designated by the open squares in FIG. 11. FIGS. 5a, 6a, 7a-1 and 7a-2 also relate to this fiber. The process for manufacturing this fiber is described below at the end of Example 1.

Figure 2B:
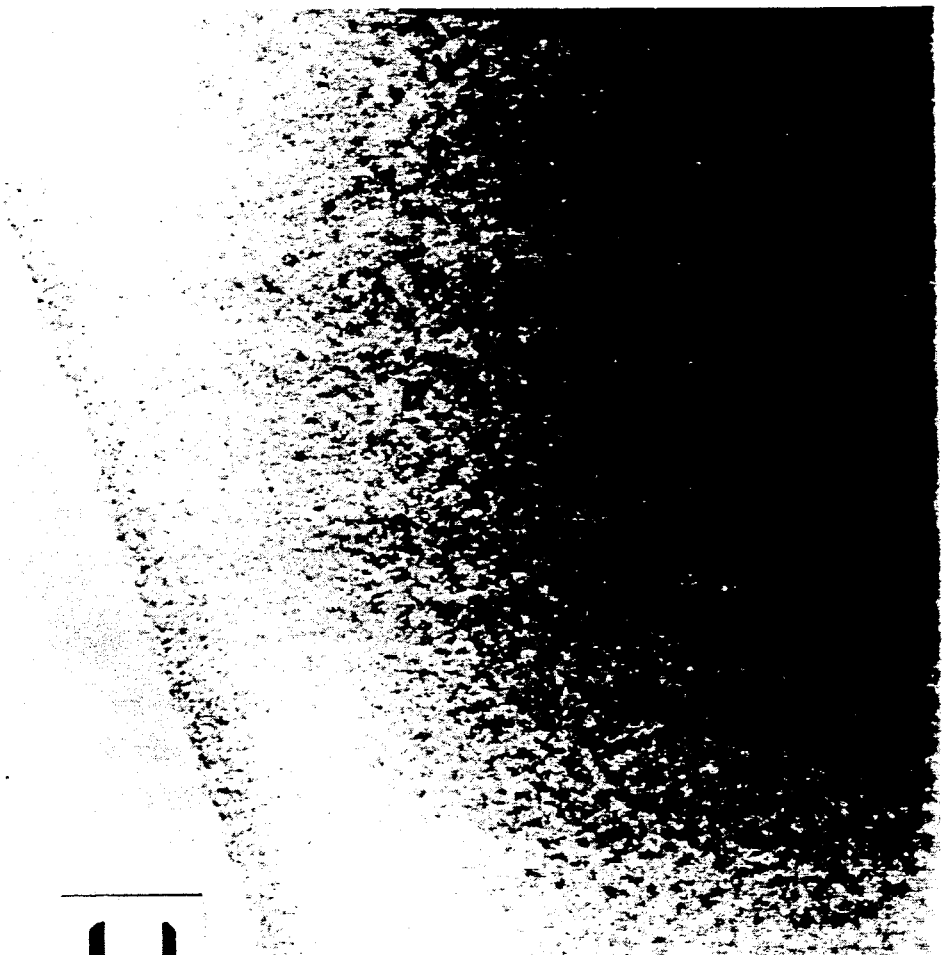

The fiber depicted in FIG. 2b had a 1.1 $\mu$m $TiO_2$-$SiO_2$ layer (roughly uniform $TiO_2$ concentration) that was dehydrated/consolidated in $Cl_2$ without $O_2$. The $TiO_2$ concentration as extrapolated from the deposition flows was 17.4 wt. % and the measured n values for this fiber were 77.8 and 80.3. The region of inhomogeneities is indicated by "b". The n value measurements for this fiber are designated by the open diamonds in FIG. 1, and the intrinsic strength measurements are designated by the open diamonds in FIG. 11. The process for manufacturing this fiber is described below in Example 3. The precise $TiO_2$ concentration of this fiber would be difficult to measure by SEM techniques, as the typical SEM beam spot depth is greater than 1 $\mu$m; an SEM measurement would always give a minimum concentration for at least one layer in the fiber, as the measured value would be reduced by the $SiO_2$ interrogated by the deeper portion of the SEM beam.

The fiber depicted in FIG. 2c had a 2.5 $\mu$m $TiO_2$-$SiO_2$ layer (roughly uniform $TiO_2$ concentration) that was dehydrated/consolidated in $Cl_2$ and $O_2$. The end-on SEM measurement of $TiO_2$ concentration in the fiber was 13.4 wt. % and the measured n value was 54.6. The region of inhomogeneities is indicated by "b". The n value measurement for this fiber is designated by the higher $TiO_2$ concentration open circle in FIG. 1.

Figure 2D:
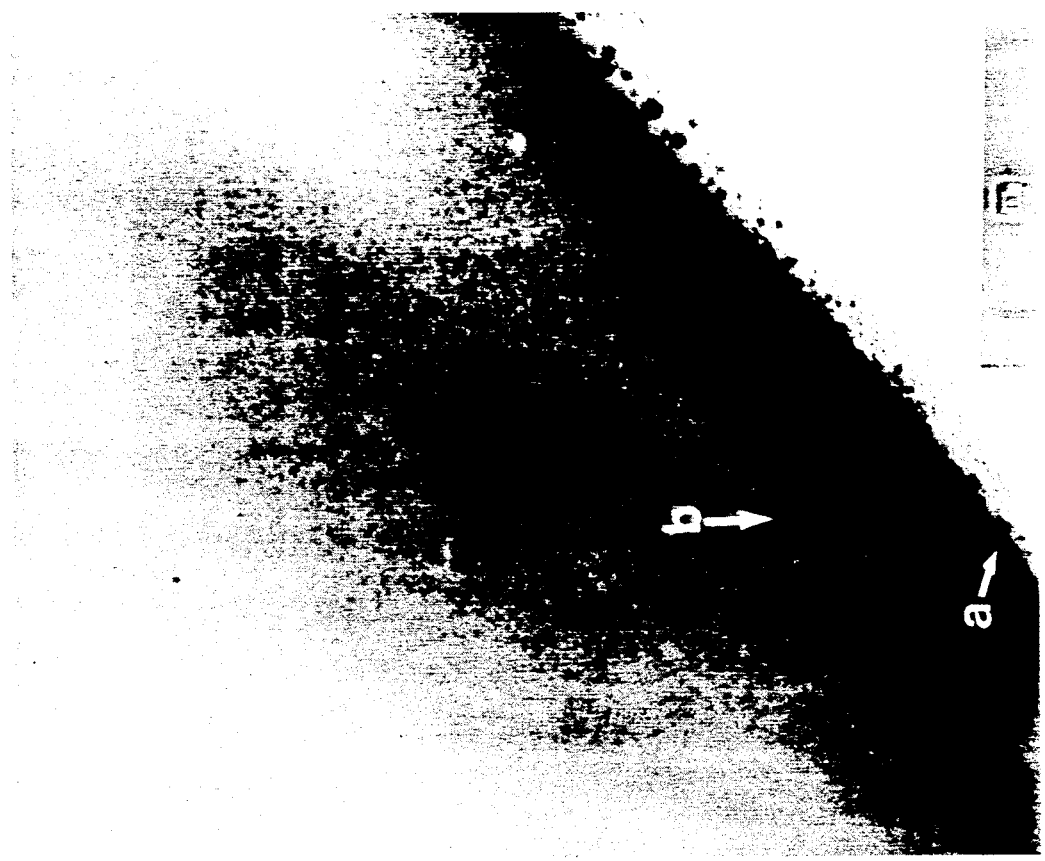
Figure 2C:
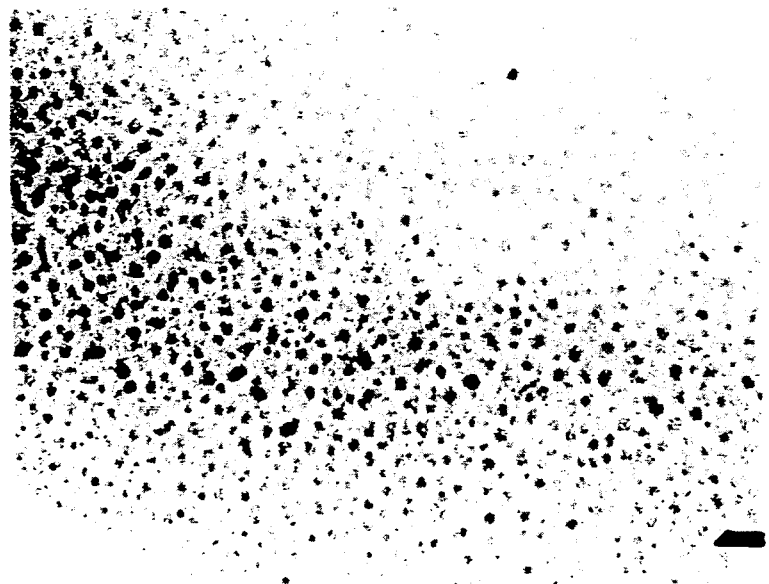

The fiber depicted in FIG. 2d had a 3.5 μm $TiO_2$-$SiO_2$ outer layer including a 3.1 μm first layer with 10.9 wt. % $TiO_2$ (end-on SEM measurement of the fiber), and a 0.4 μm outermost higher concentration layer with about 16.0 wt. % $TiO_2$ (as extrapolated from the deposition flows). The $TiO_2$-$SiO_2$ layer was dehydrated/consolidated in $Cl_2$ and $O_2$ and the measured n value was 41.3. The fiber surface is indicated by "a" and the region of inhomogeneities is indicated by "b". The n value measured for this fiber indicates that a high $TiO_2$ concentration in the first primary layer of such a two layer fiber would be preferable for achieving extremely high n values.

B. MANUFACTURING PROCESS

As described above, one aspect of the present invention relates to processes for manufacturing optical fibers with fatigue resistant $TiO_2$-$SiO_2$ outer claddings. The methods of the invention are particularly suitable for use with the outside vapor deposition (OVD) and the vapor axial deposition (VAD) soot laydown processes. OVD processes are described in Berkey U.S. Pat. No. 4,453,961 and further described in Berkey U.S. Pat. No. 4,486,212, and in the various patents referred to in those patents, the pertinent portions of all of which are incorporated herein by reference. VAD processes are described in *Optical Fiber Communications*, vol. 1, 1985, Bell Telephone Laboratories, Inc. section 3.3, pp. 100–116, and in U.S. Pat. No. 4,367,085.

Figure 3:
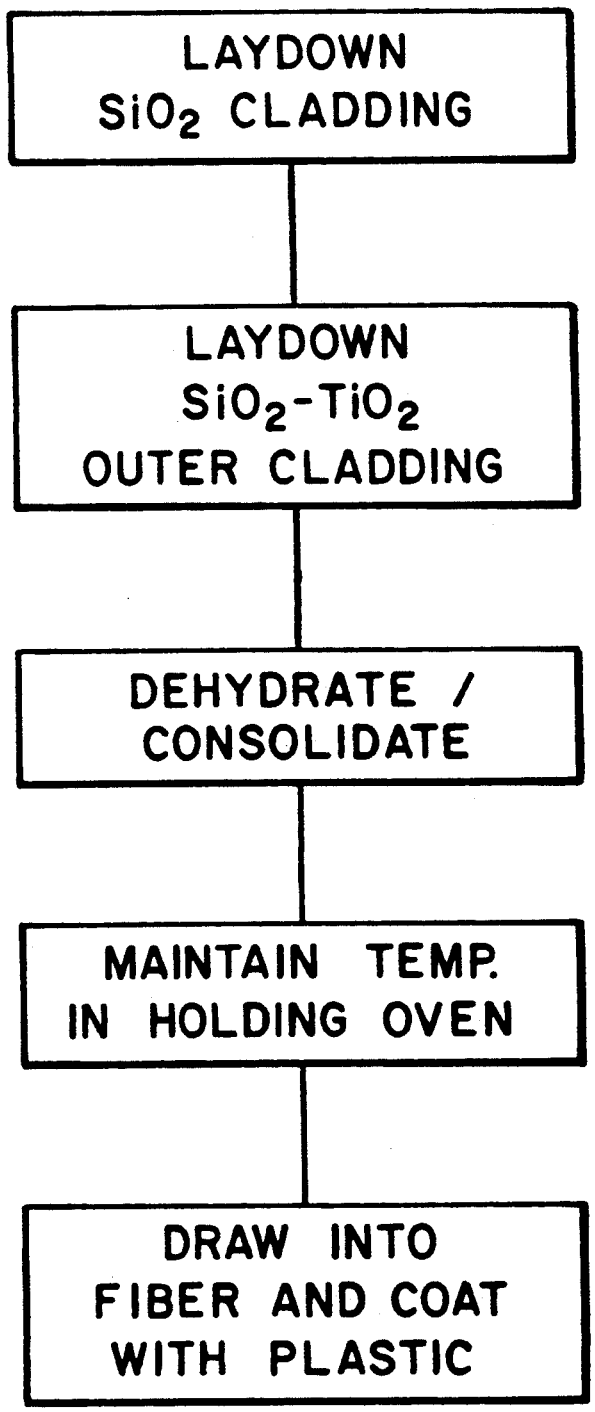
FIG. 3 is a rough flow chart of a manufacturing process for making optical fiber with a TiO$_2$-SiO$_2$ outer layer.

A flow diagram of one method in accordance with the present invention is set forth in FIG. 3. In this process, an additional laydown of one or more $TiO_2$-$SiO_2$ soot layers is provided at the end of a conventional OVD soot laydown process. In one embodiment, this additional laydown step is included in the process for manufacturing a single unitary soot preform with a core region and a cladding region, as described in Berkey U.S. Pat. No. 4,486,212. In another embodiment, the additional laydown step is provided at the end of an overcladding process such as is also described in Berkey U.S. Pat. No. 4,486,212 whereby a large diameter intermediate fiber comprising the core region and a portion of the cladding region is overcoated with additional cladding soot. It is known in the art that OVD and VAD soot laydown may be carried out with a plurality of burners, as described in Berkey U.S. Pat. No. 4,684,384 and Powers U.S. Pat. Nos. 4,378,985 and 4,568,370.

The additional laydown of a $TiO_2$-$SiO_2$ layer is carried out as follows. The $SiCl_4$ vapor is provided to the burner by a reactant delivery system of the type described in Blankenship U.S. Pat. No. 4,314,837. In addition, the $TiCl_4$ vapor is provided to the burner by a flash vaporization system as described in copending Antos et al. U.S. patent application Ser. No. 07/456,118, entitled Flash Vaporizer System for Use in Manufacturing Optical Waveguide Fiber, and filed concurrently herewith, which is incorporated herein by reference.

Figure 4B:
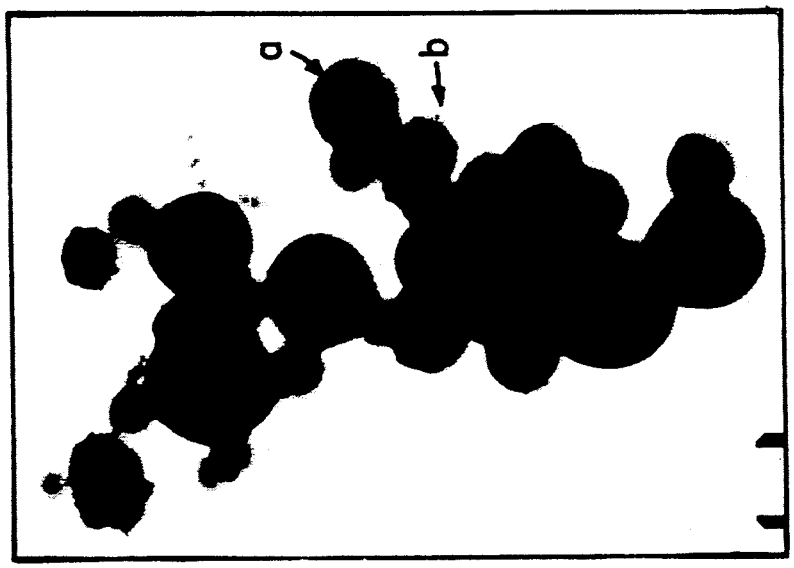
FIGS. 4a-4b are TEM photomicrographs of agglomerations of TiO$_2$-SiO$_2$ soot particles.
Figure 4A:
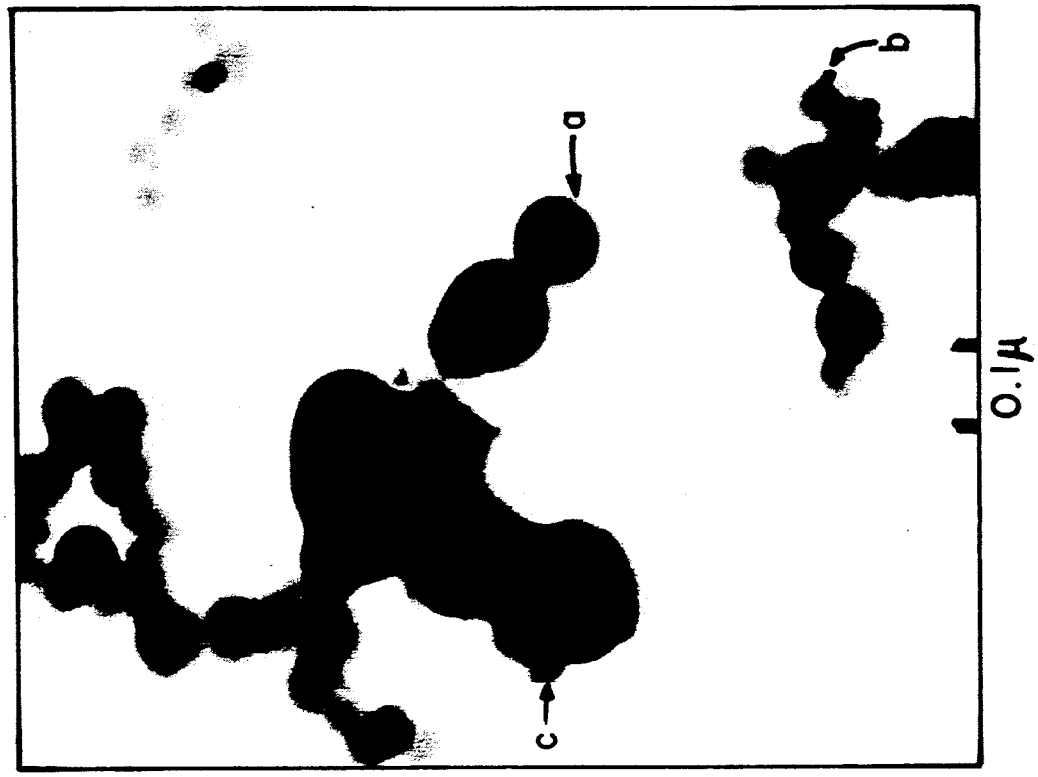

$SiO_2$ soot consists of agglomerations of glass soot particles with diameter in the range from about 0.1 to 0.3 μm. It is believed that $TiO_2$-$SiO_2$ soot exists in three separate forms: a) agglomerations of particles of roughly homogeneous solutions of $TiO_2$ in $SiO_2$, with about the same diameter as $SiO_2$ soot particles; b) tiny anatase crystalline fines on the surface of these particles, typically less than about 90 Angstroms in diameter (these fines being more prevalent in compositions with greater than about 10.5 wt. % $TiO_2$); and, c) larger anatase crystals agglomerated with the particles, typically between 200 and 1,000 Angstroms in diameter. These three forms are shown in FIGS. 4a and 4b (TEM photomicrographs) as "a", "b" and "c". This soot was measured by wet chemical analysis, and by extrapolation from the deposition flows, to be 13 wt. % $TiO_2$.

X-ray diffraction (XRD) can be used to roughly quantify the volume percentage of $TiO_2$ crystals above around 200 Angstroms in diameter at levels above about 0.1 vol. %. Transmission Electron Microscopy (TEM) may be used to detect the crystalline fines, but it is not satisfactorily quantitative. Although the presence of anatase in the soot was confirmed by TEM, XRD is unable to quantify large anatase crystals in the soot until the $TiO_2$ concentration exceeds about 9 wt. %. In the soots we studied, concentrations of up to about 1 vol. % crystals were found in soot with $TiO_2$ concentration of up to about 13 wt. %.

It is theorized that the $TiCl_4$ and $SiCl_4$ react at approximately the same temperature in the flame, forming the roughly homogeneous glass particles, except where the $TiCl_4$ can react with $H_2O$ at temperatures less than approximately 1600° C. As the solubility limit of $TiO_2$ in $SiO_2$ is exceeded, the fines of $TiO_2$ may be precipitated from the molten particles. The larger anatase crystals may be formed by the reaction of $TiCl_4$ with $H_2O$ at temperatures less than about 1600° C. in the cooler centerline of the burner flame. In one embodiment of the invention, the two forms of anatase are uniformly distributed throughout the $TiO_2$-$SiO_2$ layer as a function of layer concentration. The size and prevalence of anatase crystals in the soot preform may be increased by the presence or addition of $H_2O$ in the deposition flame reaction.

After laydown, the soot preforms are dehydrated and consolidated, typically in a chlorine atmosphere, as described in DeLuca U.S. Pat. No. 3,933,454, Powers U.S. Pat. No. 4,125,388, and Lane et al. U.S. Pat. No. 4,741,748. Pertinent portions of these patents are also incorporated herein by reference. The dehydration and consolidation steps can be carried out simultaneously or in two different steps, provided that rewetting of the dehydrated preform is avoided by the use of a dry inert gas atmosphere or other means. In an alternative embodiment, the deposition of the $TiO_2$-$SiO_2$ outer cladding layer may be carried out after the dehydration/consolidation of the rest of the preform, and the resultant preform with a soot outer cladding layer may be thereafter dehydrated, or otherwise treated with chlorine, and consolidated.

If no movement of the $TiO_2$ occurred in the fiber making process subsequent to laydown (i.e., in dehydration/consolidation and in draw), it would be preferable for the anatase to be uniformly distributed in the soot preform in order to achieve uniform distribution of $TiO_2$ and/or inhomogeneities in the drawn optical fiber. However, we have discovered that for higher concentrations of $TiO_2$ in the soot preform, the use of chlorine in dehydration/consolidation results in $TiO_2$ transport, crystal growth and surface depletion.

A substantial fraction of anatase crystals between 0.05 and 5 μm, typically around 0.5 to 1.5 μm, are found in the solid glass blank after dehydration/consolidation. Depending on the $TiO_2$ concentration and dehydration/consolidation conditions, the concentration of crystalline $TiO_2$ above 0.3 μm in diameter in the glass blank increased from small vol. % at 8 wt. % $TiO_2$ to over 5 vol. % at about 14 wt. %. The large population of crystals between 0.05 μm and 0.3 μm could not be quantified. However, as the size distribution of the crystals mapped by SEM was the largest at the smallest crystal diameters detected, the population of the crystals below 0.3 μm may be at least as large.

It is believed that, at temperatures above about 900° C., the chlorine attacks anatase-rich regions in the soot preform during dehydration/consolidation but does not attack homogeneous $TiO_2$-$SiO_2$ glass regions. In addition, this attacked Ti is transported and redeposited on other anatase crystals, resulting in the elimination of anatase fines and growth of larger anatase (or rutile) crystals in the fully consolidated glass blank. There is also depletion of the anatase near the surface of the glass blank.

Figure 5A:
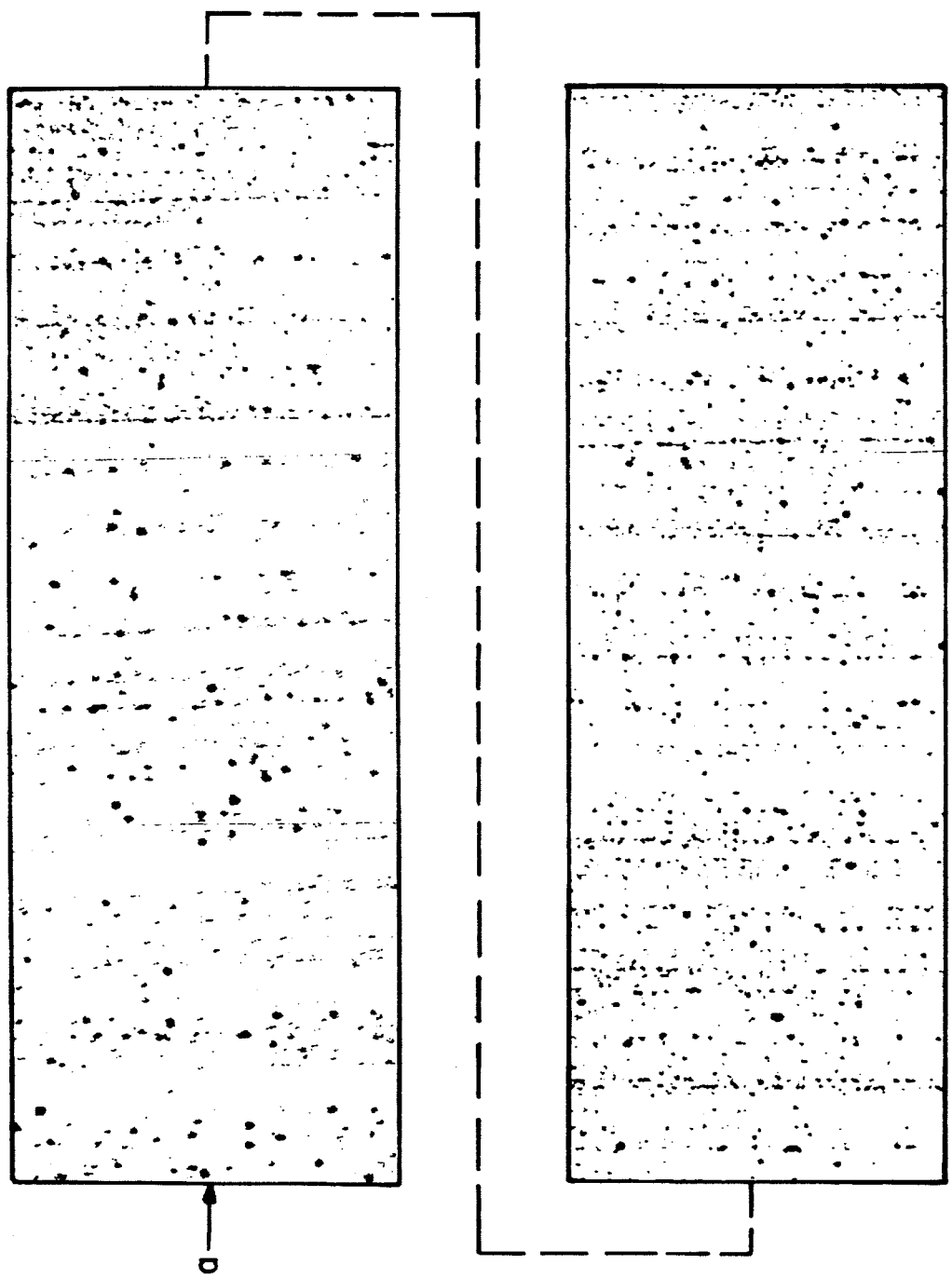
Figure 5C:
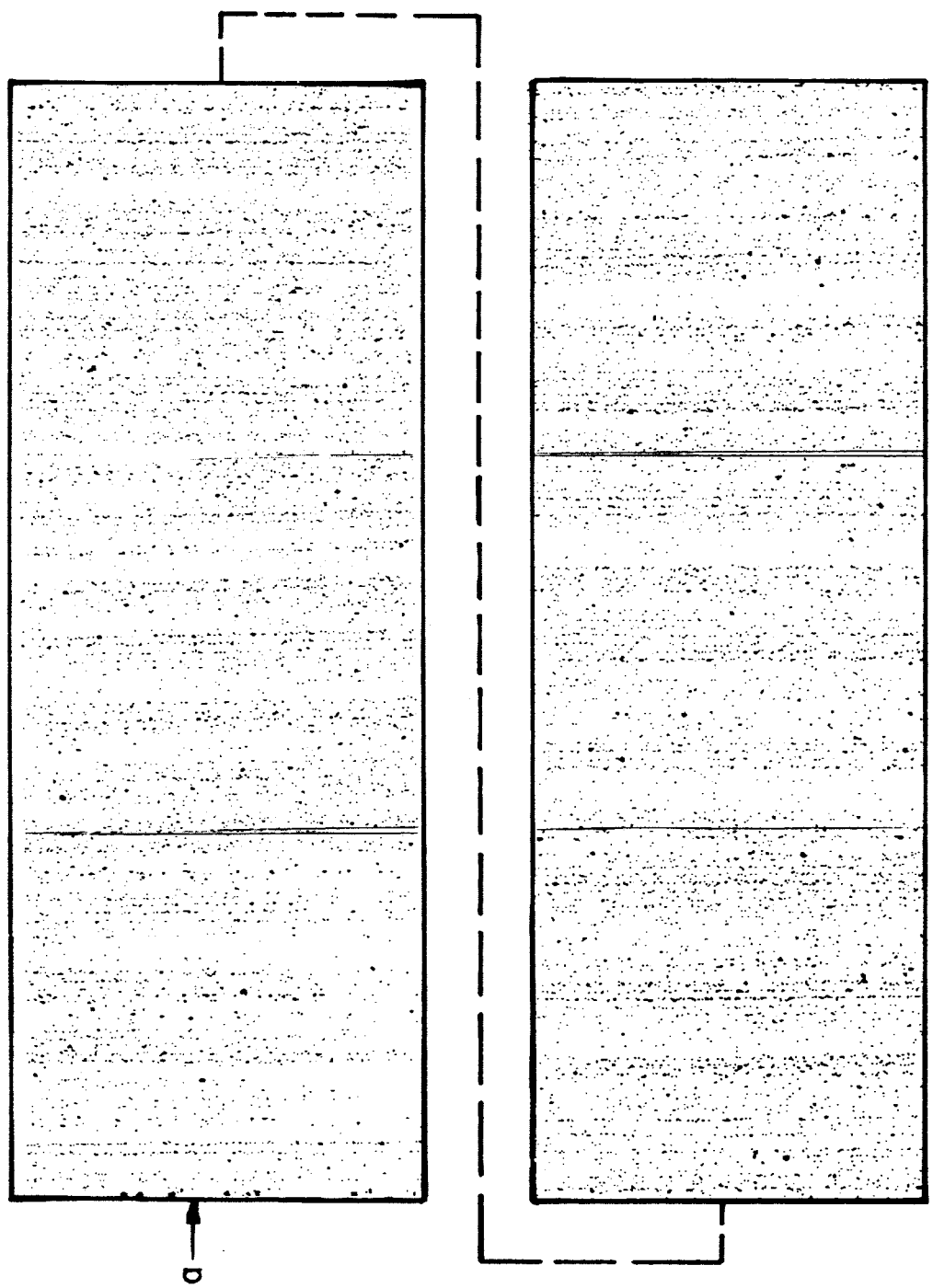
Figure 6A:
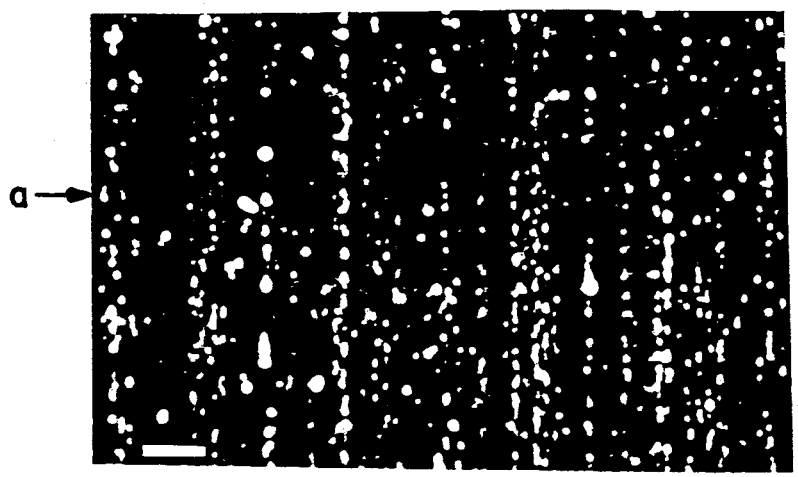
FIGS. 6a-6c are the SEM photomicrographs related to the computer simulated maps in FIGS. 5a-5c.
Figure 6B:
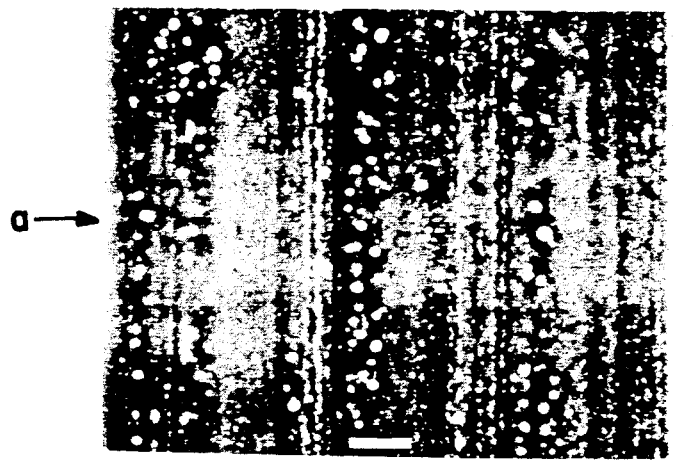
Figure 6C:
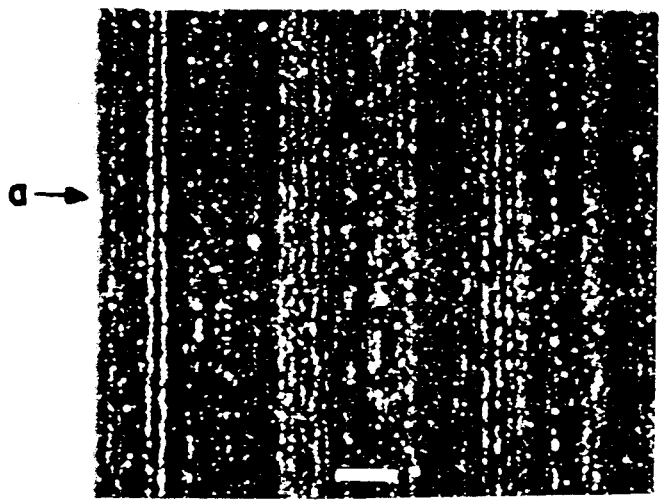
Figures 1, 7A:
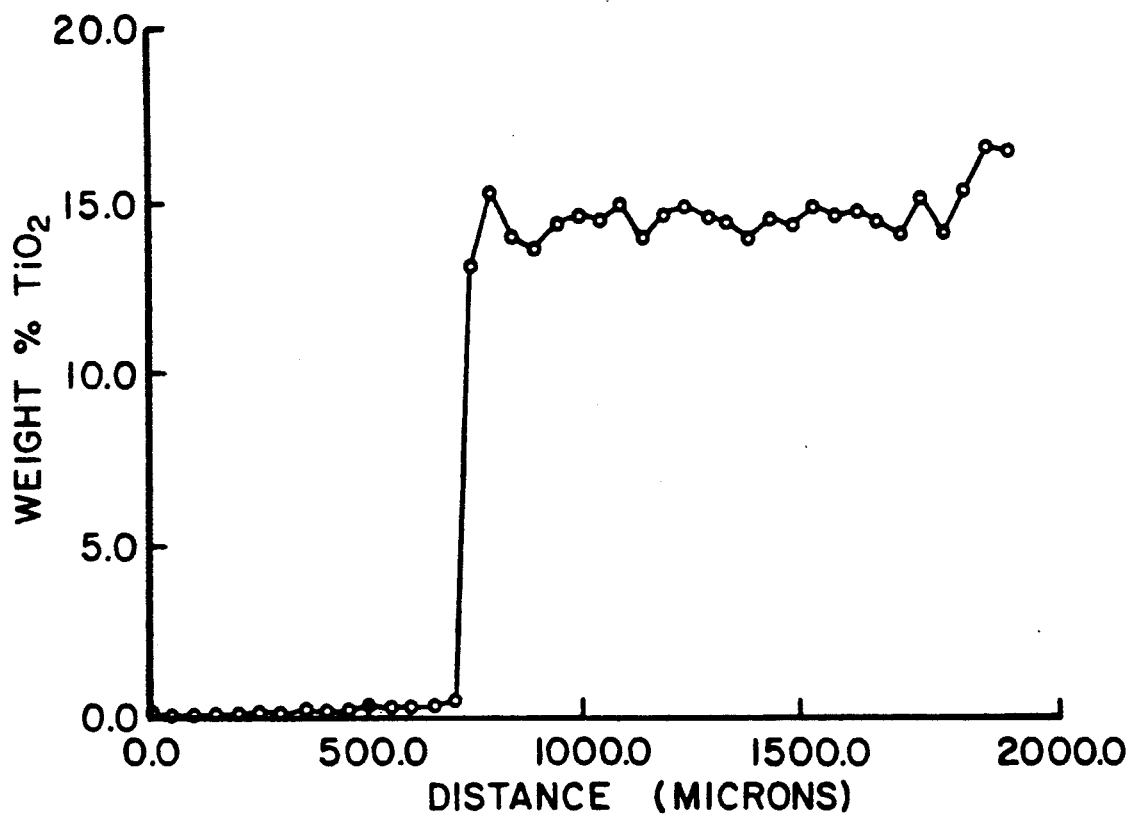
Figures 2, 7A:
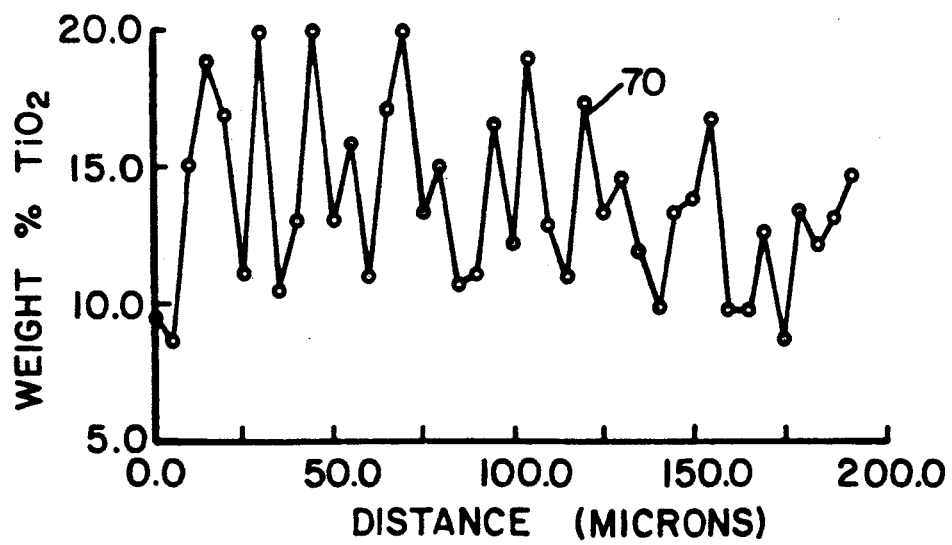

A significant proportion of the anatase in the preform is grown to sizes above 0.3 μm, so that in the glass blank, these crystals were observable by Scanning Electron Microscopy (SEM) measurements of crystals >0.3 μm (see the computer simulated maps generated from the SEM data, FIGS. 5a–5c, and the direct SEM photomicrographs, FIGS. 6a–6c). The fiber surface in these FIGS. is indicated by "a". FIGS. 7a-1, 7a-2, 7b-1, 7b-2, 7c-1 and 7c-2 depict electron microprobe measurements of $TiO_2$ concentrations in consolidated glass blanks. The spikes in FIGS. 7a-2 and 7c-2 are due to the presence of large crystals designated by 70. The SEM measurements for 7a-2 were made in the region of the blank above the root portion, where the crystals were still apparent to the unassisted eye. The "-2" plots are based on higher resolution measurements of the surface regions of the outer cladding layers whose measured $TiO_2$ concentrations are depicted in the related "-1" plots. FIGS. 5a, 6a and 7a-1 and 7a-2 are associated with fiber "a" which is described above with reference to FIG. 2a. In FIGS. 7a-1 and 7a-2, the fiber surface is at the right side of the graph.

Figures 1, 7B:
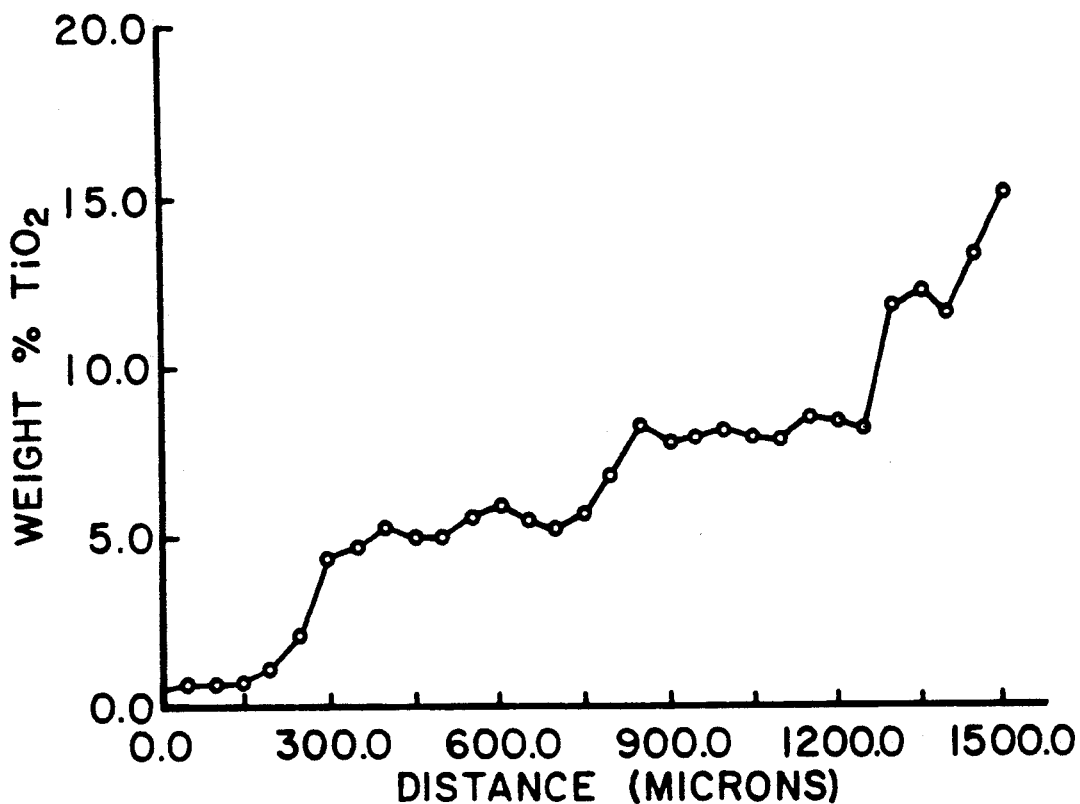
Figures 2, 7B:
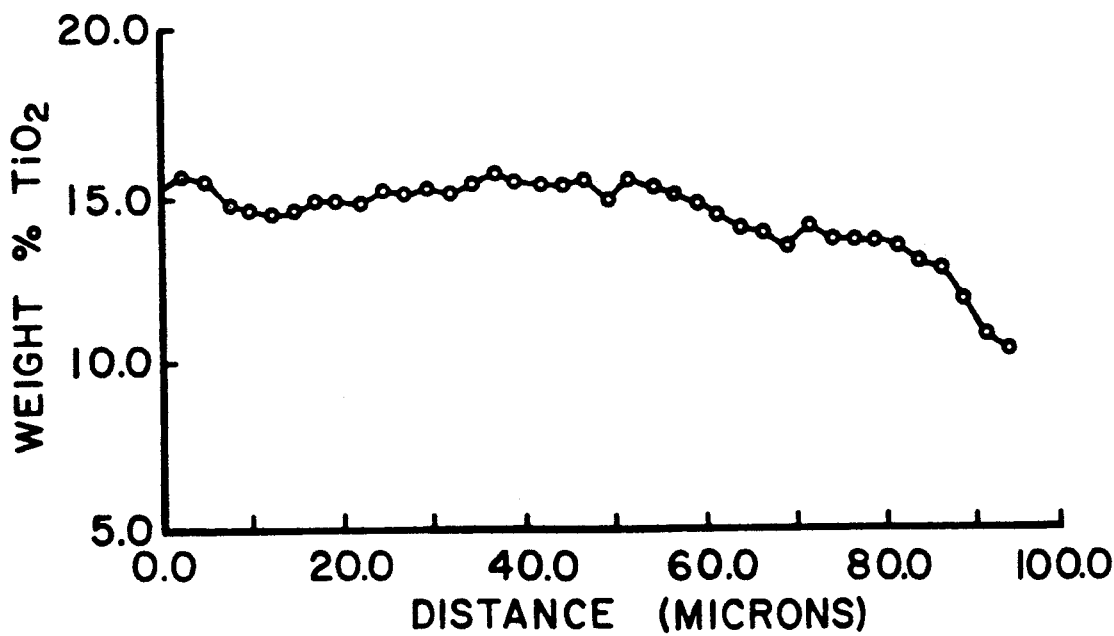
Figures 1, 7C:
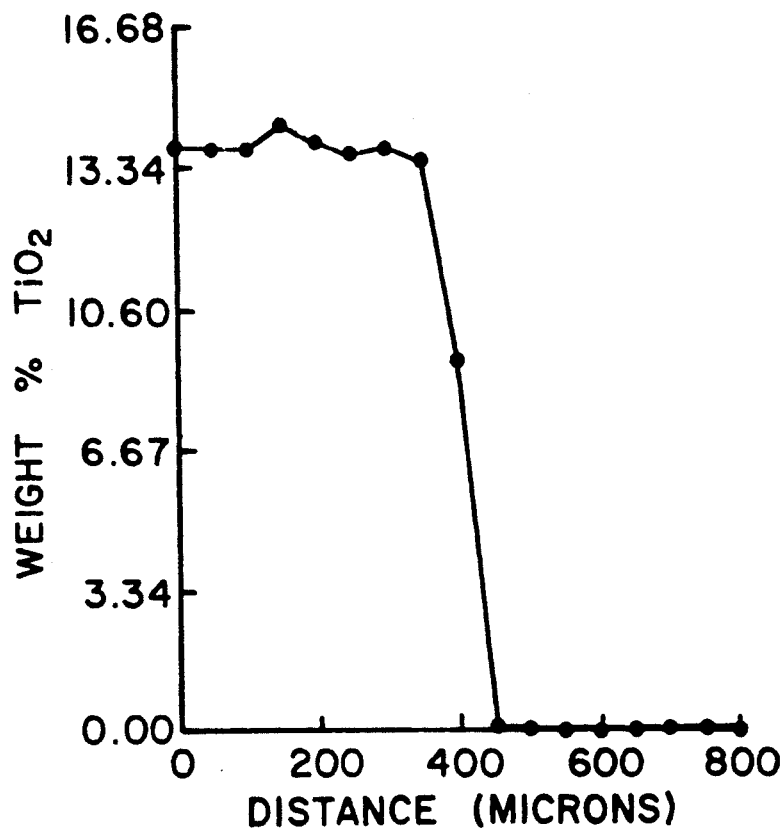

FIGS. 5b, 6b and 7b-1 and 7b-2 are associated with fiber "b" which had a 3.0 μm $TiO_2$ layer with a 1.4 μm first layer of approximately 5.5 wt. % $TiO_2$, a 1.0 μm first higher concentration layer of approximately 8.0 wt. % $TiO_2$, a 0.35 μm second higher concentration layer of approximately 12 wt. % $TiO_2$, and a 0.25 μm third higher concentration layer of approximately 15.5 wt. % $TiO_2$. These concentrations were extrapolated from electron microprobe measurements of the glass blank; the end-on SEM measurement of the fiber was 10.1 wt. %. The n value of fiber "b" was measured to be 46. The blank was dehydrated/consolidated in an atmosphere of $Cl_2$ without $O_2$. In FIGS. 7b-1 and 7b-2, the fiber surface is at the right side of the graph.

FIGS. 5c, 6c and 7c-1 and 7c-2 are associated with fiber "c" which had a 1 μm [Backer: 3 μm?] $TiO_2$ layer (roughly uniform $TiO_2$ concentration) with about 13.8 wt. % $TiO_2$ (measured by electron microprobe on the glass blank). The blank was consolidated in an atmosphere of $Cl_2$ and $O_2$. In FIG. 7c-1, the fiber surface is at the left side of the graph, and in FIG. 7c-2, the fiber surface is at the right side of the graph.

The scale of FIGS. 5a–5c is 1″=34.4 μm. The photomicrographs in FIGS. 6a–6c are of the outer portion of the $TiO_2$-$SiO_2$ outer cladding layer in the glass blank. The simulated maps (FIGS. 5a–5c) use a slightly different resolution and depict more of the outer cladding layer. The SEM photomicrographs in FIGS. 6a–6c were taken with a 25 kvolt 70 Angstrom beam that was rastered over the sample to get an image. The electron microprobe measurements in FIGS. 7a, 7b-1, 7b-2, 7c-1 and 7c-2 were taken as follows with a 15 kvolt beam: 7a-2 μm beam, 50 μm steps; 7b-1 - rastered over a grid 50 μm square with 50 μm steps; 7b-2 - 70 Angstrom spot with 2.5 μm steps; 7c-1 - 50 μm spot with 50 μm steps; and, 7c-2 - 1 μm spot with 1 μm steps. For the SEM measurements, the spot size is the two dimensional diameter. The beam depth at 15 kvolt is about 1.5 μm and the beam pattern is pear shaped in the 3rd dimension.

It is believed that the attacked anatase near the lower density surface of the preform diffuses quickly to the surface and is transported away from the preform, resulting in depletion of the $TiO_2$ in the blank surface layer. In contrast, in the typically higher density interior of the preform, the transportable $TiO_2$ is trapped in the preform and no significant Ti loss occurs. Moreover, in glass blanks originally laid down by the OVD process, there may be gradients of crystal concentration across the blank depending on the local density variations created by consecutive laydown passes. A possible explanation is that "channels" remain between soot pass layers providing axial flow paths for Ti that is transported during dehydration/consolidation, resulting in increased local redeposition.

The reaction chemistry is believed to be:

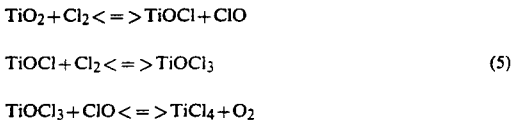

As explained below, the presence of $O_2$ during dehydration/consolidation inhibits migration of Ti. However, as the above equations indicate, although $O_2$ suppresses $TiCl_4$ formation, it cannot depress the formation of the various mobile titanium oxychloride species, and therefore cannot eliminate the possibility of $TiO_2$ depletion. $O_2$ is effective in reducing $TiO_2$ depletion because it represses the third reaction above which tends to be irreversible, thereby forcing the reactions back toward the $TiO_2$ product. The overall reaction mechanism is first order proportional to the $Cl_2$ concentration (as experimentally observed). The actual magnitude of $TiO_2$ depletion will also be a function of temperature (higher T, faster rate), $O_2$ concentration (more $O_2$, less depletion), flow rate (higher flow, greater depletion), and time (the longer the exposure, the more depletion and the greater the likelihood that the preform will be affected by dynamic flow stripping in the furnace).

The percentage chlorine used in drying impacts the average anatase size to a greater extent than does the $TiO_2$ concentration, with higher percentage chlorine resulting in larger anatase crystals in the glass blank. Higher percentage chlorine also results in substantially increased surface depletion. Significant (>1 wt. %) depletion at the surface does not appear to be present for $TiO_2$ concentrations below about 5 wt. %, for preforms dehydrated/consolidated in $Cl_2$ without $O_2$, inasmuch as $Cl_2$ attacks crystals rather than glass and the crystal levels in the soot are minute below this $TiO_2$ concentration.

We believe that the increase in n values is especially pronounced for optical fibers whose precursor blanks were dehydrated/consolidated in a $Cl_2$ atmosphere, as depicted by the open circles, open squares and open diamonds in FIG. 1, as contrasted with the open inverted triangles at about 12.5 wt. %. However, for high $TiO_2$ concentrations, acceptably high n values can be achieved even without the use of $Cl_2$ in dehydration/consolidation, as higher volume percentages of inhomogeneities are present in any event, as the $TiO_2$ concentration is increased to higher levels. It should be noted that the open inverted triangles in FIG. 1 indicate that at $TiO_2$ concentrations relatively near the 11 wt. % discontinuity, $Cl_2$ may be a significant factor in achieving enhanced n values. The open inverted triangle at about 7 wt. % in FIG. 1 indicates that $Cl_2$ is not likely to be a factor at lower $TiO_2$ concentrations.

In fiber drawn from blanks consolidated without chlorine, inhomogeneities are less apparent. It is believed that no significant growth in anatase crystals occurs if $Cl_2$ is not present during dehydration/consolidation, and the anatase populations in the glass blank reflect the distribution found in the soot preform - the concentration of crystals greater than 0.3 μm in diameter will be less than 0.1 vol. % (measurement in the blank by SEM).

Adding $O_2$ to the dehydration/consolidation gases helps to retain $TiO_2$ in the glass blank and also induces growth of anatase. It is believed that $O_2$ does not prevent $TiO_2$ from migrating, but rather inhibits its migration and concomitant loss from the blank. $O_2$ is very important in achieving a relatively flat $TiO_2$ concentration profile for designs in which varying laydown concentration is not used to compensate for depletion (see below). In addition, by using $O_2$ during dehydration/consolidation, an alumina muffle may be employed. The addition of $O_2$ to dehydration/consolidation also increases the number of anatase crystals from 2 to 4 times without correspondingly increasing the vol. % anatase (the average anatase crystal in blanks dehydrated/consolidated with $O_2$ appears to be smaller than the average anatase crystal in blanks dehydrated/consolidated without $O_2$).

The optimum lower level of $O_2$ concentration in the consolidation gases corresponds to the amount of $O_2$ required for substantial inhibition of depletion, and this function may require only a very small concentration of $O_2$. The optimum upper limit for $O_2$ concentration corresponds to an $O_2$ level at which depletion inhibition is maximized for practical purposes. The rate of increase in the depletion rate appears to be inversely proportional to the $O_2$ concentration. Tests have shown that the fatigue performance of fibers made with dehydration/consolidation oxygen levels from about 0.4 vol. % to about 20 vol. % exhibit identical fatigue performance, while fibers made with dehydration/consolidation oxygen levels below about 100 ppm show a marked degradation in fatigue performance. Experimentation has shown the $O_2/Cl_2$ ratios of as low as 1:30 are sufficient to substantially reduce depletion of $TiO_2$. In order to maintain good fatigue performance, the concentration of oxygen in dehydration/consolidation is preferably at least about 0.03-0.3 vol. % for chlorine concentrations of about 1-10 vol. %

It should be noted that in some optical fiber designs, the use of high concentrations of $O_2$ during dehydration/consolidation must be limited due to a deleterious effect on the optical performance of the resulting fiber (e.g., hydrogen effect attenuation increase). On the other hand, fibers drawn from blanks consolidated in $O_2$ appear to shown less migration of $TiO_2$ toward the center of the fiber and therefore, less attenuation due to $TiO_2$. No more than about 5 vol. % $O_2$ concentration should be used to avoid the effects of hydrogen effect attenuation on the optical performance of the fiber. Experiments have shown that dehydration/consolidation oxygen concentrations in the range of about 0.1 vol. % to 2.0 vol. % oxygen produce fibers which have acceptable hydrogen effect attenuation levels and appropriate fatigue resistance. And, for consolidation without $O_2$, a non-alumina muffle must be used to prevent contamination of the surface of the blank which would cause severe defects. $O_2$ helps to prevent the transport of alumina, thereby limiting surface attack.

As described above, there is a surprising increase in fatigue resistance at $TiO_2$ concentrations above about 10-11 wt. %. However, high $TiO_2$ concentrations may present severe manufacturing problems in normal size glass blanks with $TiO_2$-$SiO_2$ layers greater than about 0.5 mm. For draw down ratios of about 400 to 1, this corresponds with an outer cladding thickness of about 1 μm. Consolidation of such high concentration thick layers (and of other combinations of $TiO_2$ concentration and thickness, e.g., greater than about 13.5% for outer cladding thicknesses of about 3.5 μm), results in surface crazing, spalling, cracking and/or separation of the outer cladding from the remainder of the glass blank.

The fiber layers discussed herein are typically cylindrical; in other words, they are axially symmetric at any particular radius.

Figure 8:
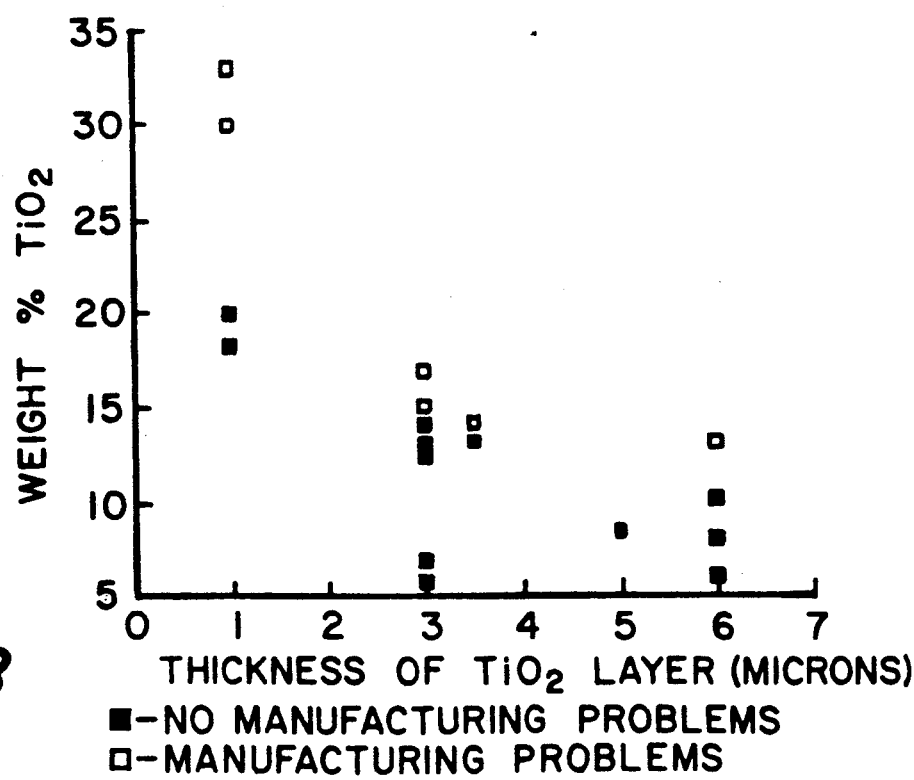
FIG. 8 is a graph showing ease of manufacturing for optical fibers having TiO$_2$-SiO$_2$ outer claddings as a function of layer thickness and TiO$_2$ concentration.
Figures 2, 7C:
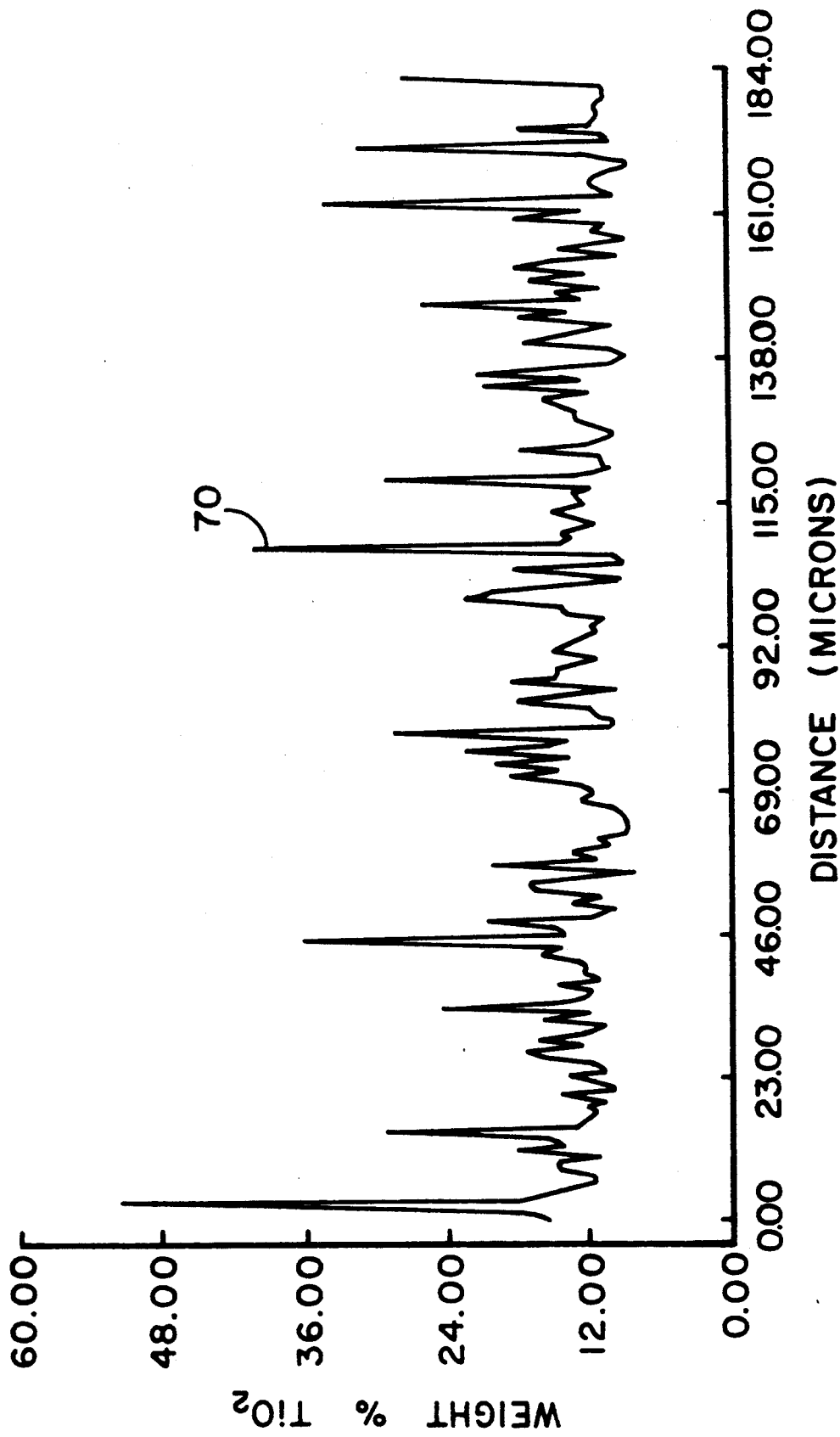

FIG. 8 depicts, for draw down ratios of about 400 to 1, the combinations of $TiO_2$ concentration and layer thickness which were more readily manufacturable (solid square), and those combinations which gave rise to manufacturing problems (open square). In addition, some fiber cleaving equipment encounters difficulties in cleaving thick layers with high $TiO_2$ concentration.

Moreover, as some proportion of fiber surface flaws are typically on the order of about 1 μm (especially as the fiber length increases), such flaws may initially pierce the thin layers of high $TiO_2$ so that the associated crack tips are in the $SiO_2$ cladding and many of the crack inhibiting mechanisms of the $TiO_2$-$SiO_2$ outer cladding are substantially lost. As described below, one method of avoiding this problem for fibers with thin $TiO_2$-$SiO_2$ layers is to use increased proof stress levels to eliminate all flaws that are on the order of the layer thickness or larger.

In order to compensate for the transport and depletion associated with chlorine, and to allow the use of a high concentration of $TiO_2$ without crazing, spalling or surface bubbles, it is one aspect of our invention to create a pre-selected laydown distribution with $TiO_2$ concentration—in at least the outermost cladding layer—that is greater than the concentration desired in the resulting fiber. In a preferred embodiment of the invention, the total thickness of the outer cladding of the fiber is about 3.5 μm. The outer cladding comprises a first $TiO_2$ layer approximately 3.1 μm thick with a concentration (as laid down) of 6-10 wt. % $TiO_2$. In the last 0.4 μm of the outer cladding, the $TiO_2$ concentration is increased by an additional 5-7.5 wt. % so that the total laydown concentration of this outermost higher concentration layer is 11-17.5 wt. %. These dimensions correspond as follows with laydown dimensions: 3.1 μm outer cladding bulk layer—8.1 mm soot layer; 0.4 μm higher concentration layer—1.0 mm soot layer. As an alternative or addition to this step increase, a ramp or other controllable method of increasing TiO₂ concentration in the depletion region may be employed.

The actual concentrations of TiO₂ as measured in the fiber are roughly the same as those extrapolated from the deposition flows, with only a slight depletion in the outermost 0.06-0.08 μm of the fiber (50 μm of the blank). (The fiber depletion thickness is extrapolated from actual measurements on the blank.) For the purposes of this application, these thin depleted regions are not considered to be separate fiber layers; a "layer" is defined to include a thicker region. For example, an "outermost layer" includes a significant layer thickness on the order of 0.1 μm or greater which incorporates this thin depleted region.

Figure 9A:
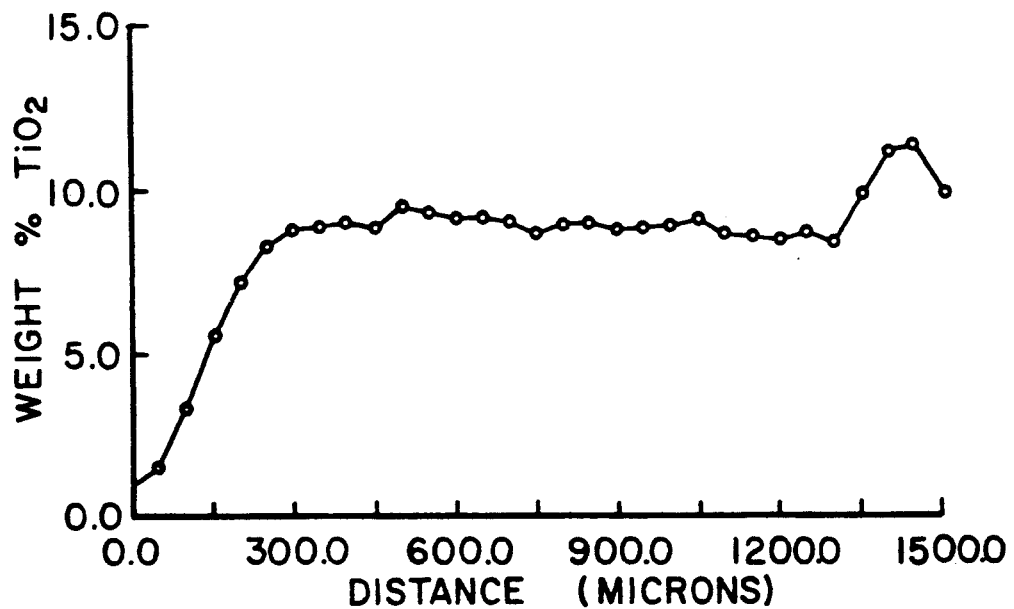
FIGS. 9a-9b are graphs of TiO$_2$ concentration vs. radial position in an outer TiO$_2$-SiO$_2$ cladding layer of a consolidated glass blank, as measured with SEM techniques.
Figure 9B:
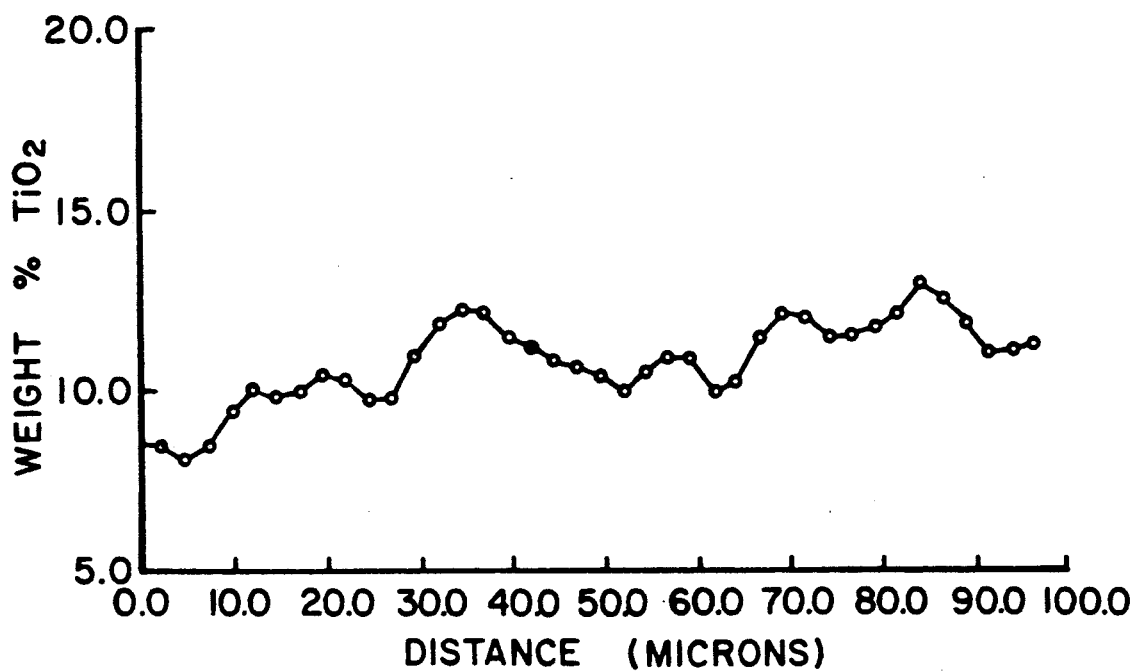

Graphs of layer thickness vs. TiO₂ concentration as measured by electron microprobe are depicted in FIGS. 9a and 9b for one consolidated glass blank. The total layer thickness in the glass blank was approximately 1.4 mm, which corresponds with a layer thickness in the fiber of about 3.5 μm. The TiO₂ concentration as extrapolated from the deposition flows was 7.5 wt. % for a 3.1 μm first layer (end-on SEM measurement gave a TiO₂ concentration of 8.6 wt. %) and 13 wt. % for a 0.4 μm outermost layer. In FIG. 9a, the blank surface is at the right side of the graph. FIG. 9b is based on a higher resolution microprobe measurement of the outermost surface layer in the same blank, with the blank surface at the left side of the graph. FIG. 9b shows a slight depletion at the surface. The blank was dehydrated/consolidated in Cl₂ without O₂.

The n value for this fiber was measured to be 30.3. This relatively low n value again indicates that the thicker primary layer plays a very important role in fatigue resistance. This measurement indicates that, for the same TiO₂ concentration in the outermost cladding layer, the higher the TiO₂ concentration in the primary layer, the higher the resulting fatigue resistance.

Figure 10:
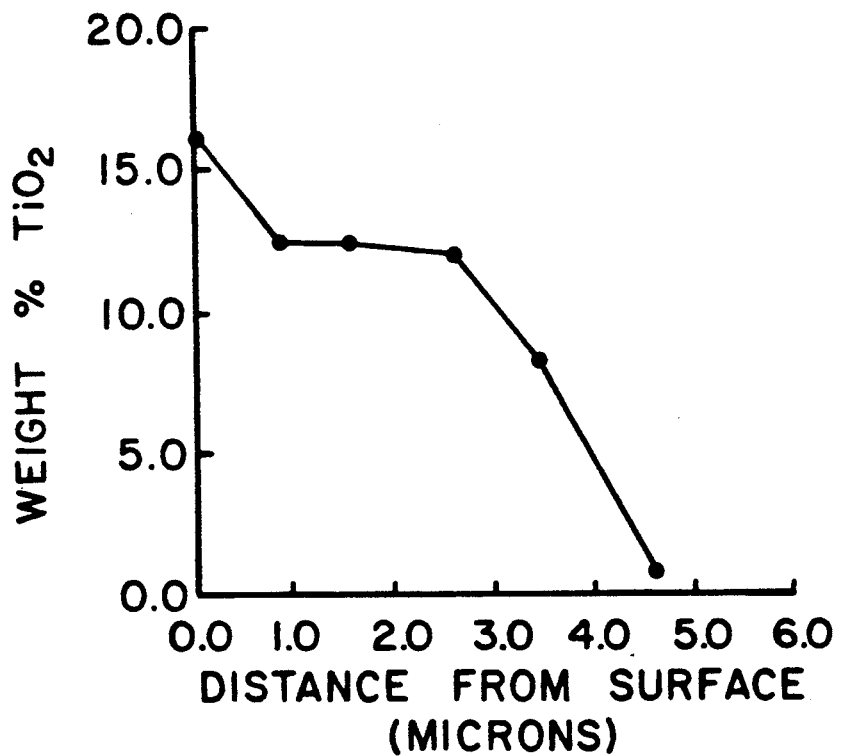
FIG. 10 is a graph of TiO$_2$ concentration vs. radial position in the outer TiO$_2$-SiO$_2$ cladding layer of the optical fiber depicted in FIGS. 9a and 9b, as measured with STEM techniques.

A graph of fiber diameter vs. TiO₂ concentration as measured by STEM techniques on the fiber is depicted in FIG. 10 for a fiber drawn from the glass blank depicted in FIGS. 9a and 9b. This graph gives a good qualitative picture of the two layer structure present in the drawn fiber. It should be noted that for very thin layers, such as the 0.4 μm outermost cladding layer, the actual concentration of TiO₂ is difficult to measure accurately in the fiber itself by STEM analysis because of the experimental sophistication required and the lack of internal calibration to TiO₂-SiO₂ standards. As shown in FIG. 10, the TiO₂ concentration measurements of a lower concentration layer surrounded by a higher concentration layer are higher than expected from the blank profile as measured by the accurate electron microprobe. However, a side view electron microprobe of the fiber surface will always underestimate the TiO₂ concentration in the higher concentration outer layer, if it is less than about 1.5 μm thick, the depth of the electron microprobe spot.

The following measurements were highly reliable and their predicted confidence interval is given in parentheses: 1) measurement of fiber layer thickness by SEM calibrated by NBS standard (±0.1 μm); 2) measurement of layer thickness in the consolidated glass blank (for the blank and the resulting fiber, as a function of draw down ratio) by electron microprobe (±1 μm); 3) measurement of TiO₂ concentration by electron microprobe in the consolidated glass blank (±0.1 wt. %); 4) measurement of the minimum TiO₂ concentration in at least one layer in the outer 1 μm of the fiber by side-on electron microprobe (±0.1%); 5) measurement of TiO₂ crystal size (>about 0.3 μm) in the consolidated glass blank by SEM (±0.1 μm); and, 6) measurement of inhomogeneity size in the fiber by STEM (±10 Angstroms).

Other multiple layer structures are also beneficial. For example, a similar thin layer with very high TiO₂ concentration could be placed at a depth corresponding to the maximum flaw size established while proof testing. This would greatly inhibit strength degradation below the proof stress. The placement of this higher concentration layer can be determined using the following fracture mechanics relation, $$\sigma_p = K_{Ic}/0.73(\pi a)^{\frac{1}{2}} \tag{6}$$

where $\sigma_p$ is the proof stress and a is the corresponding crack depth. For a discussion of crack depth vs. strength in general, see Glaesemann, Jakus, and Ritter, "Strength Variability of Indented Soda-Lime Glass", Journal of the American Ceramic Society, Vol. 70, No. 6, Jun. 1987, pp. 441-444.

Thin, higher concentration outermost layers provide numerous advantages. In a thin outermost layer, greater TiO₂ concentrations are possible without process problems in dehydration/consolidation (light bulbs, surface non-uniformity) and in draw (spalling, crazing, surface non-uniformity, non-uniform TiO₂ concentration). The diffusion of TiO₂ from the surface of the blank in dehydration/consolidation is compensated for. Higher TiO₂ concentrations result in more anatase crystals and fines to form and in a depletion layer that begins closer to the surface of the blank (i.e., a thinner depletion layer). This is believed to be due in part to the resistance to Ti mobility provided by the higher density of TiO₂-SiO₂ layers with higher TiO₂ concentration. Another advantage is that for flaws contained within the coating layer, thinner coating layers of TiO₂ at higher concentrations appear to produce higher fatigue resistance levels than thick coating layers at lower concentrations. The combination of all these attributes results in higher TiO₂ concentration on the surface which equates to higher fatigue resistance in the final fiber.

C. ADDITIONAL FEATURES

Figure 11:
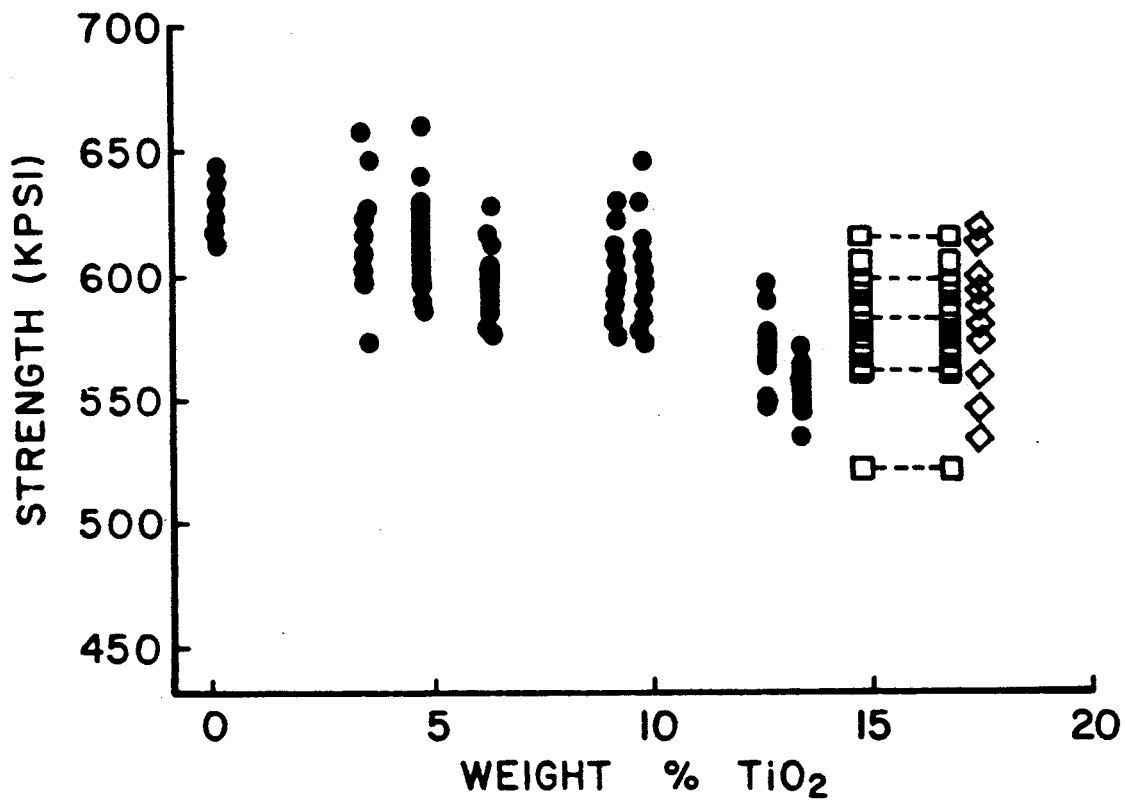
FIG. 11 is a graph of intrinsic optical fiber strength vs. TiO$_2$ concentration for a large number of optical fiber samples.

As would be expected, the intrinsic strength of our inventive optical fiber design with a TiO₂-SiO₂ outer cladding is reduced about 25-70 kpsi from that of a pure SiO₂ fiber (down from the SiO₂ values which are in the range of about 600-700 kpsi) as shown in FIG. 11 (note: the concentrations plotted by the connected open squares are for both layers of a two layer outer cladding). It appears that this reduction in intrinsic strength does not change significantly with increasing TiO₂ concentration. The test conditions for the strength measurements plotted in FIG. 11 are set forth above.

Intrinsic strength is determined by the behavior of "small flaws", which by definition are of a size that is partially if not wholly determined by the intrinsic structure of the glass at the surface. One explanation of the slight reduction in the intrinsic strength of fiber with a TiO₂-SiO₂ outer cladding compared to pure SiO₂-clad fiber is the predicted disrupted structure of the glass due to the addition of TiO₂. This is also supported by the lower Young's modulus measured on such fiber (see Glaesemann et. al., "Effect of Strain and Surface Composition on Young's Modulus of Optical Fibers", OFC Conference, 1988 Technical Digest Series, Vol. 1, TUG5, Jan. 1988). It is therefore believed that the flaws associated with the high strength region are uniformly distributed over the entire glass surface. That means that regardless of the gauge length of a fiber, a uniform doping with $TiO_2$ yields a finite upper limit to strength that is less than that of $SiO_2$.

For most optical fiber applications, however, it is not the intrinsic strength that is of primary concern but the frequency of breaks below the intrinsic strength region (the extrinsic strength). The manufacture of fiber with a $TiO_2$-$SiO_2$ outer cladding in the manner described above results in a significant reduction of extrinsic flaws. This is believed to be due to the reduction of draw furnace particle inclusions observed in fibers with a $TiO_2$-$SiO_2$ outer layer.

Intrinsic strength (small flaw) analysis is also useful in understanding the fatigue resistance of our inventive fiber. A given length of fiber has only a single origin of failure and therefore, under axial tension, one intrinsic flaw is larger than all the others in that length of fiber. This is confirmed by the strength decrease observed with increasing gauge length, as the probability of a larger flaw occurring increases with gauge length. Accordingly, the fiber will have the fatigue resistance associated with crack growth in an inhomogeneous fiber cladding material only if the worst flaw on the fiber length being tested encounters an inhomogeneity. Therefore, the preferred fiber design will provide inhomogeneities of sufficient size and distribution that a randomly occuring worst flaw in a given fiber length will always encounter an inhomogeneity.

No decrease in the intrinsic strength region has been observed for our inventive fibers compared with fibers having nominally flat $TiO_2$ doped profiles, no depletion, and $TiO_2$ concentration below about 10 wt. %. On the other hand, our inventive fibers yield extremely high n values. Therefore, we believe that intrinsic flaws are encountering inhomogeneities which reduce their growth, but the inhomogeneities themselves do not appear to affect extrinsic strength (note: a compressive stress effect for large flaws/low strengths is discussed below). Inhomogeneities are not a site for weakening, i.e., they do not necessarily provide the site for the worst case flaw. The inhomogeneities should be uniformly spread over the fiber surface to have a 100% chance of encountering the largest intrinsic flaw.

The distribution in size and location of the inhomogeneities is a primary determinant of whether the various inhomogeneity-induced crack growth resistance mechanisms will be effective in enhancing fatigue resistance. There are many ways of examining this problem, but we conjecture that the minimum inhomogeneity size will be determined by the smallest inhomogeneity that can alter the stress field about the crack tip and that the maximum inhomogeneity size for a given volume percentage of inhomogeneities is that size at which the probability of a flaw propagating through the layer and encountering a inhomogeneity becomes appreciably less than 1. Concerning small inhomogeneities, consider a 600 kpsi flaw which has a depth of approximately 160 Angstroms. It is conjectured that the minimum inhomogeneity size needed to affect the stress field in this case is about 10 to 16 Angstroms.

To estimate the maximum inhomogeneity size it is important to note that the $TiO_2$ concentration and fiber processing conditions determine the volume percentage of inhomogeneities. We now consider all flaws within a 0.5–3.5 μm outer cladding layer encountering randomly (not uniformly) dispersed inhomogeneities. One method of arriving at the maximum inhomogeneity size is to calculate the probability that all flaws along an one kilometer length of fiber will not encounter an inhomogeneity before traversing the layer, and hence, will not experience enhanced crack inhibition. For one volume percentage of inhomogeneities we have observed in our inventive fiber (around 10%), to ensure that all flaws have a high probability of encountering an inhomogeneity, the average inhomogeneity size should be less than about 100 Angstroms in diameter (for 20 vol. %, the average inhomogeneity size should be less than about 250 Angstroms). Inhomogeneities of a size larger than this limit, although effective in hindering the propagation of a given flaw that is deliberately placed near a inhomogeneity, do not optimally use the available $TiO_2$ to provide the highest confidence that all flaws anywhere in the layer will be affected by a inhomogeneity.

The average diameter of the inhomogeneities in the outer cladding layer of our inventive fibers are within the range of approximately 10–100 Angstroms. Preferably, a substantial portion of the inhomogeneities are within the range of from 30–50 Angstroms. The size of the inhomogeneities may be measured by STEM techniques to ±10 Angstroms. X-RAY diffraction techniques may be used to discern whether any substantial fraction (greater than about 0.1 vol. %) of inhomogeneities with diameters greater than about 200 Angstroms is present in the outer cladding layer, as the resolution minimum for X-RAY diffraction techniques is on the order of 200 Angstroms.

For reliability purposes, optical fibers are usually proof tested to establish a maximum flaw depth. In the context of our present concern it is desirable to have the maximum flaw contained within the $TiO_2$-$SiO_2$ layer over the life of the fiber. In the case of no flaw growth during the in-service life, the layer depth is equal to the maximum crack depth which can be determined from the fracture mechanics relationship set forth above, $$\sigma_p = K_{Ic}/0.73(\pi a)^{\frac{1}{2}} \tag{6'}$$

where $\sigma_p$ is the minimum strength taken to be the proof stress, a is the crack depth, and $K_{Ic}$ is the fracture toughness which is taken to be 0.7 MPa m$^{\frac{1}{2}}$. Table I gives crack depth for a range of proof stresses.

TABLE I

| $TiO_2$—$SiO_2$ Crack Depth as a Function of Proof Stress | |
|---|---|
| Layer Depth (μm) | Proof Stress (kpsi) |
| 2.5 | 50 |
| 1.7 | 60 |
| 1.3 | 70 |
| 0.6 | 100 |
| 0.2 | 200 |
| 0.07 | 300 |

Thus, from Table I it can be seen that all surface cracks would be less than 1.3 μm deep after proof test at 70 kpsi and therefore all surface cracks would be completely contained in a 1.3 μm $TiO_2$-$SiO_2$ outer cladding layer. In addition layer depth can be extended to accommodate anticipated crack growth over the fiber life. For example, 10% crack growth over 40 years from a minimum strength of 50 kpsi would require a layer depth of 2.8 microns.

As discussed above, the conventional explanation for improved fatigue resistance in optical fibers with $TiO_2$-

SiO$_2$ outer layers has been the compressive stress resulting from the mismatch in the thermal coefficients of expansion for the SiO$_2$ and TiO$_2$-SiO$_2$ layers. We have found that this effect is not substantial in our inventive fibers for small flaws (corresponding with strengths and proof stresses greater than about 150 kpsi).

We have measured the compressive stress in representative samples of our fiber as follows:

| | | | |
|---|---|---|---|
| 8/12 wt. % (two layer) | 3.1/0.4 μm | 12,840 psi | [n = 30] |
| 14.7/16.7 wt. % (two layer-FIG. 2a) | 3.1/0.4 μm | 16,080 psi | [n = 87] |
| 17.4 wt. % (single layer-FIG. 2b) | 1.1 μm | 5,880 psi | [n = 80.3] |

For large flaws below the 150 kpsi minimum proof stress level, it is believed that compressive stresses in the range of 15–20 kpsi may play a role in fiber strength (break rate) and fatigue resistance. In practical terms, a fiber subjected to a low stress (less than 65–70 kpsi) during cabling or subsequent use would see a benefit. For example, large flaws remaining after proof stress that would normally grow critically at 65–70 kpsi bending or tensile stress would only see a stress of about 50 kpsi.

This may provide an advantage for applied stresses near the proof stress level inasmuch as residual compressive stresses may enhance the fatigue resistance of a fiber with poor strength. For such fibers, the measured n value may be higher than the n value determined from the material composition by an amount corresponding with the compressive stress. Thus, the introduction of a residual compressive stress on the outside of the glass cladding leads to better apparent fatigue behavior for large flaws than for small flaws. However, for handling and reliability purposes it is still desirable to have as few large flaws as possible.

On the other hand, for higher bending/tensile stresses that are applied to the fiber in high proof stress applications, the residual compressive stress provides little or no benefit. For the small flaws that are associated with such higher stresses, the compressive stress is quickly overcome and subcritical crack growth ensues. This is the case for fiber applications which require proof stresses in the range of 150–300 kpsi, such as undersea cables, local area networks, and specialty applications such as gyroscopes or wound fiber bobbins for tethered missiles.

In addition, we have found that our inventive fibers with higher TiO$_2$ concentrations have substantially improved abrasion resistance. Therefore, these fibers will be less likely to develop large, low strength flaws due to improper handling.

Conventional techniques for calculating residual compressive stress, such as measurement of the thermal coefficient of expansion mismatch by trident seal techniques, are not amenable to glass optical fiber. Therefore, we measured the state of residual stress (compression or tension) of the titania-silica layer directly using a photoelastic technique which did not require knowledge of the coefficient of thermal expansion. This technique requires that the layer be transparent and that optical retardation differences be measurable within the layer.

Using a polarizing microscope, the axial stress within the layer can be calculated from the following equation:

$$\sigma = \frac{3.15 A}{K\rho} \quad (7)$$

where
 $\sigma$ = stress in psi,
 A = compensator angle in degrees
 K = stress optical constant, 0.292 nm/cm/psi
 $\rho$ = optical path in cm.

The optical path length was calculated by $$\rho = 2(Da)^{\frac{1}{2}} \quad (8)$$

where a is the layer thickness and D is the thickness of the inner (silica) body.

The stress optical constant, K, was calculated by extrapolating the known values for ULE (code 7971) glass (8 wt. % TiO$_2$) and fused silica (code 7940). The value was limited to 0.292 nm/cm/psi to avoid underestimating the stress. Thus, the calculated stress values are expected to be, if anything, over-estimated.

The optical retardation or birefringence was determined by rotation of a compensator in the microscope where one degree of rotation is equal to 3.15 nm of retardation. A stress can be computed with a precision of ±10%. The determination of whether a stress is compressive or tensile was determined with a calibrating glass bar.

The compressive stress for a fiber with a homogeneous glass layer of TiO$_2$-SiO$_2$ 2.5 μm thick with 8.7 wt. % TiO$_2$ was measured to be 8.63 kpsi by the above technique.

D. EXAMPLES

The following are examples of embodiments of our inventive design and manufacturing process.

EXAMPLE 1

In one embodiment of the invention, fibers were made by the following process. First, a large diameter (8.1 mm) intermediate fiber was produced by the process described in Berkey U.S. Pat. No. 4,486,212. This intermediate fiber, comprising the core and a portion of the cladding in the resulting fiber, was placed in an overcladding lathe for the deposition of SiO$_2$ soot as further described in U.S. Pat. No. 4,486,212. The overcladding lathe rotated the intermediate fiber in front of three pairs of soot deposition burners which traversed back and forth in front of the intermediate fiber on three shuttles spaced at 45° angles along a 90° arc. The two burners in each pair were fixed in relation to each other. The optimum shuttle speed was 2.0 cm/sec., and the intermediate fiber rotated at 150 rpm. The burners were similar to those described in connection with FIG. 1 in Powers, Sandhage and Stalker U.S. patent application Ser. No. 435,966, filed Nov. 13, 1989, which is copending with the present application (see also Blankenship U.S. Pat. No. 4,314,837 and the patents referred to in U.S. Pat. No. 4,486,212). In this manner, the intermediate fiber was overcoated with SiO$_2$ soot to a diameter of 108–118 mm.

Thereafter, two of the pairs of burners were turned off and a TiO$_2$-SiO$_2$ outer layer was laid down by the single shuttle in two stages of reactant flows. In a first deposition stage a layer with TiO$_2$ concentration centered at 8 wt. % was created to a layer thickness of approximately 8.1 mm (this corresponds with about 3.1 μm in the drawn fiber). In a higher concentration stage after the first stage, a second layer with TiO$_2$ concentration centered at 14.5 wt. % was laid down to a thickness of approximately 1.0 mm (this corresponds with 0.4 μm in the drawn fiber). The total thickness of the TiO$_2$-SiO$_2$ layer was 9.1 mm.

Figure 12:
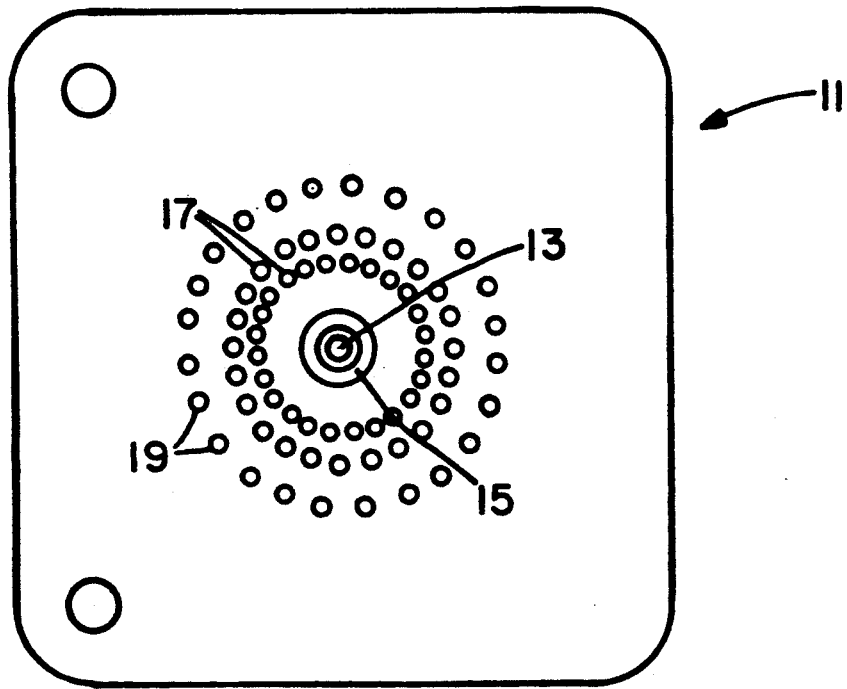
FIG. 12 is a drawing of a burner endface for use in flame hydrolysis/oxidation deposition.

The reactant delivery system was of the type described in Blankenship U.S. Pat. No. 4,314,837. In addition, a flash vaporization system, as described in the copending Antos et al U.S. patent application Ser. No. 07/456,118, entitled Flash Vaporizer System for Use in Manufacturing Optical Waveguide Fiber, was incorporated to deliver the TiCl$_4$ vapor. FIG. 12 depicts the face 11 of one of the burners used in this process, with central fume tube 13, inner shield annulus 15, fuel premix orifices 17 and outer shield orifices 19.

The optimum flows to each burner during deposition of the TiO$_2$-SiO$_2$ layer were as follows:

| | |
|---|---|
| Fume tube SiCl$_4$: | 23.83 gm/min. |
| Fume tube O$_2$: (with SiCl$_4$) | 2.83 std. liters/min. |
| Fume tube TiCl$_4$: (first stage) | 1.5 gm/min. |
| Fume tube TiCl$_4$: (higher conc. stage) | 2.87 gm/min. |
| Fume tube O$_2$: (with TiCl$_4$) | 1.0 std. liters/min. |
| Inner shield O$_2$: | 2.9 std. liters/min. |
| Pre-mix O$_2$: | 16.67 std. liters/min. |
| Pre-mix CH$_4$: | 20.0 std. liters/min. |
| Outer shield O$_2$: | 6.6 std. liters/min. |

Between the deposition of the first layer and the second higher concentration layer, the soot preform is allowed to cool for a period of preferably approximately 10 minutes, in order to allow the TiCl$_4$ flow to stabilize at the new set point. It is believed that this helps to produce a uniform step interface between the two layers and to increase the level of TiO$_2$ crystal capture at the interface.

The process sequence was carried out as follows. First, SiO$_2$ was deposited for 88.5% of the overcladding deposition weight. Second, the TiCl$_4$ flow was stabilized by flowing into a vent before merging with the SiCl$_4$ system. After stabilization, the TiCl$_4$/O$_2$ mixture was merged into the SiCl$_4$ line connected with the single shuttle that was depositing the TiO$_2$-SiO$_2$ soot. Deposition of the first stage took place from 88.5 wt. % of the overcladding deposition to 98.5 wt. %. Thereafter, the depositing shuttle returned to its starting position and the TiCl$_4$ flow was restabilized to the higher concentration stage flow. After stabilization, the shuttle traversed the blank for three passes (one pass is one stroke up and one stroke down). The final diameter of the soot preforms ranged from 108 to 118 mm.

The soot preform was next introduced into a dehydration/consolidation furnace as described in Lane et al. U.S. Pat. No. 4,741,748, relevant portions of which are incorporated herein by reference. In this process, 0.3 std. liters/min. Cl$_2$ and 40 std. liters/min. He were used throughout, and no O$_2$ was introduced into the furnace.

In a first oscillating coil mode, the coil traversed the entire blank at a temperature of approximately 1100° C. for about 20 minutes. Thereafter, the coil temperature was increased to approximately 1400°–1450° C. and driven from the bottom of the blank up at a velocity of about 7 mm/min. This peak consolidation temperature was slightly lower than for standard SiO$_2$ clad blanks, because of the lower viscosity of the TiO$_2$-SiO$_2$ and to allow complete dehydration prior to glaze over of the TiO$_2$-SiO$_2$ layer at the blank tip. After the blank was completely consolidated, there was a 5 minute purge of any residual Cl$_2$ using He and N$_2$ so that the blank could be unloaded safely. After the blank was removed from the consolidation furnace, it was kept for at least approximately 6 hours in a holding oven at 850° C. in an atmosphere of air, prior to drawing. The holding oven step is preferable but it is not believed to be required.

The consolidated blank diameter ranged from 50 to 60 mm. The diameter of the first stage layer ranged from 1.2 to 1.5 mm, with the higher concentration stage layer comprising the last 0.2 to 0.25 mm. The outer 50 μm layer was depleted to about 8 wt. % TiO$_2$, and the next 200 μm into the surface was approximately 14.25 wt. % TiO$_2$. TiO$_2$ concentration measurements were made by SEM.

The blank was then drawn into a fiber in a draw furnace. The draw handle was modified according to the design described in Bailey U.S. Pat. No. 4,126,436, to eliminate diameter upsets resulting from unstable thermal conditions in the blank near the handle. The fiber was coated by a coater of the type described in Kar et al. U.S. Pat. No. 4,531;959, and coating bubbles were suppressed by a technique of the type described in Deneka et al. U.S. Pat. No. 4,792,347.

In the drawn fiber, the total fiber diameter was 125 μm, the entire TiO$_2$ layer was 3.5 μm, the higher concentration stage layer was approximately 0.4 μm, and the depleted layer was about 0.06–0.075 μm. The measured n values for the fiber averaged over 40.

The fiber with a measured n value of 87 that is depicted in FIG. 2a and designated by the open squares in FIGS. 1 and 11 was made by this process with increased TiO$_2$ flows relative to the SiO$_2$ flows. A very small amount of O$_2$ is believed to have been present during the dehydration/consolidation process due to a leaky valve in an O$_2$ delivery line that was programmed to be closed during the process.

EXAMPLE 2

In another example, the same fiber was manufactured but the first stage of the TiO$_2$-SiO$_2$ outer cladding layer was deposited using all six burners. The burners were arranged in pairs substantially the same as in the first example with respect to SiO$_2$ deposition, but all six burners operated for the first stage of the TiO$_2$-SiO$_2$ deposition. Three shuttle deposition resulted in higher rates of soot laydown. The TiCl$_4$ flow was split into three lines after leaving the flash vaporizer, and these lines were merged into the three SiCl$_4$ delivery lines for the pairs of burners on each of the three shuttles.

The equipment and timing sequences for the three shuttle process are substantially the same as for the single shuttle process. At about 83% of the target preform weight, TiCl$_4$ was turned on to vent to stabilize the TiCl$_4$ flow. TiCl$_4$ flow to the preform began at about 88.8% of target weight. In the higher concentration stage, the flows to two of the three shuttles were shut off at about 98.5% of the target preform weight and the remaining shuttle operated as described above with respect to TiO$_2$-SiO$_2$ deposition in the first example.

The optimum flows to each burner during the deposition of the TiO$_2$-SiO$_2$ layer were as follows:

| Fume tube SiCl₄: (first stage) | 35 gm/min. |
|---|---|
| Fume tube SiCl₄: (higher conc. stage) | 23.83 gm/min. |
| Fume tube O₂: (with SiCl₄) | 1.5 std. liters/min. |
| Fume tube TiCl₄: (first stage) | 3.08 gm/min. |
| Fume tube TiCl₄: (higher conc. stage) | 3.0 gm/min. |
| Fume tube O₂: (with TiCl₄) | 0.67 std. liters/min. |
| Inner shield O₂: | 2.9 std. liters/min. |
| Pre-mix O₂: | 11.2 std. liters/min. |
| Pre-mix CH₄: | 13.3 std. liters/min. |
| Outer shield O₂: | 6.6 std. liters/min. |

The optimum shuttle speeds were all 3.72 cm/sec. and the intermediate fiber rotated at about 275 rpm. An attempt was made to eliminate shuttle overtakes where one shuttle passed another while moving in the same vertical direction. The resulting soot preform had increased density in the cladding layer and a lower density in the $TiO_2$-$SiO_2$ layer than in the first example. The layer thicknesses in the fiber were the same as in the first example. The n values for fibers made by this process were not measured.

EXAMPLE 3

The thin layer process is substantially identical to the single shuttle process with a few exceptions. The TiCl₄ flow is stabilized to vent at 90% of the target weight and $TiO_2$ deposition begins at 96.8% of the target weight. The burner flows are the same as in the single shuttle process, except that the TiCl₄ flow is 4.6 gm/min. for each burner. The $TiO_2$ concentration was relatively uniform over a single thin layer. The fiber layer thickness as measured by SEM was about 1.0–1.2 μm, and the $TiO_2$ concentration as extrapolated from the deposition flows was about 17.4 wt. %, although a side-on SEM measurement of one of the fibers indicated a $TiO_2$ concentration of 15.8 wt. %. Two of the fibers made by this process had measured n values of 76.8 and 80.3 and are designated in FIGS. 1 and 11 by open diamonds (see also FIG. 2b).

EXAMPLE 4

In another embodiment of the invention, soot preforms were made on a lathe that traversed the large diameter intermediate fiber back and forth in front of two stationary burners. The blank was traversed in front of the burners at a slow velocity in one direction (29 mm/min.) and then returned to the start position at a second fast velocity (1282 mm/min.), so that deposition essentially took place only in one direction. The spindle rotated at about 168 rpm.

During deposition of the $SiO_2$ cladding layer, at about 81.5% of the target blank weight, the TiCl₄ flow was stabilized to vent, and $TiO_2$ deposition began at 88.7% of target weight. The average soot preform diameter was about 80.6 mm.

The optimum flows to each burner during the deposition of the $TiO_2$-$SiO_2$ layer were as follows:

| Fume tube SiCl₄: | 23.7 gm/min. |
|---|---|
| Fume tube O₂: (with SiCl₄) | 2.8 std. liters/min. |
| Fume tube TiCl₄: | 1.45 gm/min. |
| Fume tube O₂: (with TiCl₄) | 1.25 std. liters/min. |
| Inner shield O₂: | 2.5 std. liters/min. |
| Pre-mix O₂: | 9.9 std. liters/min. |
| Pre-mix CH₄: | 12.05 std. liters/min. |
| Outer shield O₂: | 5.0 std. liters/min. |

In this example, the soot preform was dehydrated/consolidated in a stationary hot zone furnace of the type described in DeLuca U.S. Pat. No. 3,933,454 and Powers U.S. Pat. No. 4,125,388.

The preform was quickly lowered into the top of the furnace and held there for 8 minutes while the gas flow is stabilized at:

| O₂ | 1.17 std. liters/min. |
|---|---|
| He | 41.23 std. liters/min. |
| Cl₂ | 0.34 std. liters/min. |

The peak hot zone temperature was about 1590° C. The minimum temperature at the top of the furnace was about 800° C. The preform was then driven down into the hot zone at a downfeed rate of approximately 7 mm/min. All of the dehydration/consolidation gases continued to flow. The Cl₂ flow was shut off after about 190 minutes, and the blank was held in a bottom hold position for 15 min. (the top of the blank was in the hot zone). After the 15 min. hold time elapsed, the blank consolidation was complete and the blank was pulled up out of the furnace.

Fibers made by this process had approximately 3.5 μm $TiO_2$-$SiO_2$ outer cladding layers with $TiO_2$ concentrations measured to be 12.6 and 13.4 wt. % by extrapolation of the deposition flows. The average n value was 45.6. Two of the fibers made by this process are designated by the open circles in FIG. 1 (see also FIG. 2c).

There have been various physical dimension changes to the bump in alternative designs. We have made blanks with two higher concentration layers (with same overall thickness as standard) and higher concentration layers which are a constant ramp of TiCl₄ flow/$TiO_2$ concentration. We have also made fiber with higher concentration outermost cladding layers from 0.18 to 0.8 μm thick and having varying $TiO_2$ concentrations.

The present invention has been particularly shown and described with reference to preferred embodiments thereof, however, it will be understood by those skilled in the art that various changes in the form and details may be made therein without departing from the true spirit and scope of the invention as defined by the following claims.

We claim:

1. A method for manufacturing a fatigue resistant optical waveguide fiber with a $TiO_2$-$SiO_2$ outer cladding, comprising, forming a doped $SiO_2$ preform with a core portion and a cladding portion, depositing a layer of $TiO_2$-$SiO_2$ soot with a $TiO_2$ concentration profile on the outside of said cladding portion to create an augmented preform, said $TiO_2$-$SiO_2$ soot layer including at least one cylindrical axially symmetric layer with thickness of about 0.1 μm or greater having a $TiO_2$ concentration greater than 10.5 wt. %, exposing said augmented preform to an atmosphere containing chlorine and oxygen at a temperature within the range of about 900° to 1400° C., said oxygen being present in a concentration that is sufficient to substantially maintain said $TiO_2$ concentration profile of said $TiO_2$-$SiO_2$ layer, consolidating said preform into a glass blank with a $TiO_2$-$SiO_2$ outer cladding layer, and drawing said glass blank with a $TiO_2$-$SiO_2$ outer cladding layer into an optical waveguide fiber with inhomogeneities in the outer $TiO_2$-$SiO_2$ layer of the fiber.

2. The method of claim 1 wherein said exposing step further comprises exposing said augmented preform to an oxygen containing atmosphere comprising at least about 0.03 vol. % oxygen.

3. The method of claim 2 wherein said exposing step further comprises exposing said augmented preform to an oxygen containing atmosphere comprising at least about 0.1 vol. % oxygen.

4. The method of claim 1 wherein said exposing and consolidating steps are carried out in a furnace with an alumina muffle.

5. The method of claim 1 wherein said exposing step further comprises exposing said augmented preform to an oxygen containing atmosphere whose oxygen concentration is below a level which results in substantially no increase in hydrogen effect attenuation in said optical waveguide fiber.

6. The method of claim 5 wherein said exposing step further comprises exposing said augmented preform to an oxygen containing atmosphere comprising from about 0.03 vol. % to about 2.0 vol. % oxygen.

7. The method of claim 6 wherein said exposing step further comprises exposing said augmented preform to an oxygen containing atmosphere comprising from about 0.1 vol. % to about 0.3 vol. % oxygen.

8. A method for manufacturing a fatigue resistant optical waveguide fiber with a $TiO_2$-$SiO_2$ outer cladding, comprising, forming a doped $SiO_2$ preform with a core portion and a cladding portion, depositing a layer of $TiO_2$-$SiO_2$ soot with a $TiO_2$ concentration profile on the outside of said cladding portion to create an augmented preform, said $TiO_2$-$SiO_2$ soot layer including at least one cylindrical axially symmetric layer with thickness of about 0.1 μm or greater having a $TiO_2$ concentration greater than 10.5 wt. %, exposing said augmented preform to an atmosphere containing chlorine and oxygen at a temperature within the range of about 900° to 1400° C., said oxygen being present in a concentration sufficient to substantially reduce the depletion of $TiO_2$ from said augmented preform that results from the presence of chlorine in said exposing step and/or to substantially reduce the migration of $TiO_2$ toward the center of said augmented preform thereby substantially maintaining said $TiO_2$ concentration profile of said $TiO_2$-$SiO_2$ layer, consolidating said preform into a glass blank with a $TiO_2$-$SiO_2$ outer cladding layer, and drawing said glass blank with a $TiO_2$-$SiO_2$ outer cladding layer into an optical waveguide fiber with inhomogeneities in the outer $TiO_2$-$SiO_2$ layer of the fiber.

9. The method of claim 8 wherein said exposing step further comprises exposing said augmented preform to an atmosphere containing oxygen in a concentration of at least about 0.03 vol. % oxygen.

10. The method of claim 9 wherein said exposing step further comprises exposing said augmented preform to an atmosphere containing oxygen in a concentration of at least about 0.1 vol. % oxygen.

11. The method of claim 8 wherein said exposing step further comprises exposing said augmented preform to an oxygen containing atmosphere whose oxygen concentration is below a level which results in substantially no increase in hydrogen effect attenuation in said optical waveguide fiber.

12. The method of claim 11 wherein said exposing step further comprises exposing said augmented preform to an oxygen containing atmosphere comprising from about 0.03 vol. % to about 2.0% oxygen.

13. The method of claim 11 wherein said exposing step further comprises exposing said augmented preform to an oxygen containing atmosphere comprising from about 0.1 vol. % to about 0.3 vol. % oxygen.

14. The method of claim 8 wherein said exposing and consolidating steps are carried out in a furnace with an alumina muffle.

* * * * *